US009125194B2

(12) United States Patent
Suzuki et al.

(10) Patent No.: US 9,125,194 B2
(45) Date of Patent: Sep. 1, 2015

(54) RADIO COMMUNICATION SYSTEM, BASE STATION APPARATUS, MOBILE STATION APPARATUS, AND RADIO COMMUNICATION METHOD

(71) Applicant: Sharp Kabushiki Kaisha, Osaka (JP)

(72) Inventors: Shoichi Suzuki, Osaka (JP); Yosuke Akimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 162 days.

(21) Appl. No.: 13/904,563

(22) Filed: May 29, 2013

(65) Prior Publication Data

US 2013/0315165 A1 Nov. 28, 2013

Related U.S. Application Data

(63) Continuation of application No. 13/146,370, filed as application No. PCT/JP2010/050675 on Jan. 21, 2010, now Pat. No. 8,498,259.

(30) Foreign Application Priority Data

Jan. 26, 2009 (JP) .................................. 2009-014588

(51) Int. Cl.
*H04W 4/00* (2009.01)
*H04W 72/04* (2009.01)
(Continued)

(52) U.S. Cl.
CPC ......... *H04W 72/0413* (2013.01); *H04L 1/1692* (2013.01); *H04L 1/1854* (2013.01); *H04L 1/1861* (2013.01); *H04L 5/0048* (2013.01); *H04L 5/026* (2013.01); *H04L 5/0053* (2013.01)

(58) Field of Classification Search
CPC ... H04L 1/1692; H04L 1/1854; H04L 1/1861; H04L 5/026; H04L 5/0048; H04L 5/0053; H04W 72/0413

USPC ......... 370/208, 210, 320, 328, 329, 335, 336, 370/341, 342, 441
See application file for complete search history.

(56) References Cited

U.S. PATENT DOCUMENTS

2003/0022636 A1 * 1/2003 Ylitalo et al. ................. 455/101
2004/0001429 A1 1/2004 Ma et al.
(Continued)

FOREIGN PATENT DOCUMENTS

CN 1663213 8/2005
EP 1919152 5/2008
(Continued)

OTHER PUBLICATIONS

3GPP TS 36.213 V8.4.0 (Sep. 2008). (From Applicant's IDS filed on May 29, 2013).*
(Continued)

*Primary Examiner* — Mark Rinehart
*Assistant Examiner* — Mang Yeung
(74) *Attorney, Agent, or Firm* — Keating & Bennett, LLP

(57) ABSTRACT

A radio communication system includes a plurality of mobile station apparatuses and a base statement apparatus. Each of the mobile station apparatuses selects the lowest number and the second lowest number of control channel elements (CCEs) in which downlink allocation information is detected, and obtains two combinations, to be applied to transmission antennas, of a physical resource block (PRB), a cyclic shift amount, and an orthogonal code sequence in the time domain, on the basis of values by adding the numbers of CCEs to an offset value broadcast by the base station apparatus. Each of the mobile station apparatuses spreads pilot signals using spread codes based on the two combinations, arranges the spread pilot signals in PRBs corresponding to the signals, and transmits the signals through the transmission antennas.

5 Claims, 10 Drawing Sheets

(51) Int. Cl.
- *H04L 1/16* (2006.01)
- *H04L 1/18* (2006.01)
- *H04L 5/00* (2006.01)
- *H04L 5/02* (2006.01)

(56) References Cited

U.S. PATENT DOCUMENTS

| | | | |
|---|---|---|---|
| 2008/0080467 A1* | 4/2008 | Pajukoski et al. | 370/342 |
| 2008/0253469 A1 | 10/2008 | Ma et al. | |
| 2009/0196166 A1* | 8/2009 | Hamaguchi et al. | 370/210 |
| 2011/0280203 A1 | 11/2011 | Han et al. | |

FOREIGN PATENT DOCUMENTS

| | | |
|---|---|---|
| EP | 2129158 | 12/2009 |
| JP | 2008236426 | 10/2008 |
| JP | 2012-509002 | 4/2012 |
| WO | 2007142313 | 12/2007 |

OTHER PUBLICATIONS

3GPP TS 36.211 V8.4.0 (Sep. 2008). (From Applicant's IDS filed on May 29, 2013).*
PUCCH TxD Schemes for LTE-A, LG Electronics, Jan. 12-16, 2009. (From Applicant's IDS filed on May 29, 2013).*
Evaluation of transmit diversity for PUCCH in LTE-A, Nortel, Jan. 12-16, 2009.(From Applicant's IDS filed on May 29, 2013).*
UL MIMO Transmission Schemes in LTE-Advanced, NTT DOCOMO, Nov. 10-14, 2008. (From Applicant's IDS filed on May 29, 2013).*
LG Electronics, "PUCCH TxD Schemes for LTE-A", R1-090216, Agenda Item 12.4—Document for Discussion and Decision, Ljubljiana, Slovenia (Jan. 12-16, 2009).
Nortel, "Evaluation of transmit diversity for PUCCH in LTE-A", R1-090135, Agenda Item 12.4—Document for Discussion/Decision, Ljubljiana, Slovenia (Jan. 12-16, 2009).
NTT DOCOMO, "UL MIMO Transmission Schemes in LTE-Advanced", R1-084250, Agenda Item 11.2—Document for Discussion/Decision, Prague, Czech Republic (Nov. 10-14, 2008).
3GPP TS 36.213 V8.4.0, "3rd Generation Partnership Project: Technical Specification Group Radio Access Network; Evolved Universal Terrestrial Radio Access (E-UTRA); Physical layer procedures (Release 8)", (Sep. 2008).
PCT/ISA/210, International Search Report for corresponding PCT/JP2010/050675 (Apr. 27, 2010).
Extended European Search Report for European Application No. 10733508 (Sep. 21, 2012).
3GPP TS 36.211 V8.4.0, "3rd Generation Partnership Project: Technical Specification Group Radio Access Network; Evolved Universal Terrestrial Radio Access (E-UTRA); Physical Channels and Modulation (Release 8)", (Sep. 2008).

* cited by examiner

RADIO COMMUNICATION SYSTEM, BASE STATION APPARATUS, MOBILE STATION APPARATUS, AND RADIO COMMUNICATION METHOD

CROSS-REFERENCE TO RELATED APPLICATION(S)

This application is a continuation of copending application U.S. Ser. No. 13/146,370 filed on Jul. 26, 2011, which is a National Phase filed under 35 USC 371 of International Application PCT/JP2010/050675 with an International Filing Date of Jan. 21, 2010, which claims priority to Japanese Application No. 2009-014588 filed on Jan. 26, 2009.

TECHNICAL FIELD

The present invention relates to a radio communication system, a base station apparatus, a mobile station apparatus, and a radio communication method.

BACKGROUND ART

The 3rd Generation Partnership Project (3GPP) has been making studies on advancement (LTE-Advanced) of Long Term Evolution (LTE or EUTRA) for radio access methods and radio networks in cellular mobile communication.

LTE-Advanced is under studies to ensure compatibility with LTE, that is, to enable a base station apparatus supporting LTE-Advanced to communicate with mobile station apparatuses supporting either of LTE-Advanced and LTE, and thus is required to use the same channel structure as in LTE as far as possible. In addition, in order to improve the quality of an uplink control channel in comparison with LTE, studies have been made on introduction of various transmission diversities using multiple transmission antennas, such as cyclic delay diversity (CDD), space frequency block code (SFBC), and space time block code (STBC).

For a downlink, LTE uses an orthogonal frequency division multiplexing (OFDM) scheme which is multi-carrier transmission. As for an uplink, LTE uses a single carrier communication scheme of a DFT (discrete Fourier transform)-Spread OFDM scheme which is single carrier transmission.

For the downlink in radio communication from a base station apparatus to a mobile station apparatus, LTE uses a broadcast channel (Physical Broadcast Channel; PBCH), a downlink control channel (Physical Downlink Control Channel; PDCCH), a downlink shared channel (Physical Downlink Shared Channel; PDSCH), a multicast channel (Physical Multicast Channel; PMCH), a control format indicator channel (Physical Control Format Indicator Channel; PCFICH), and an HARQ indicator channel (Physical Hybrid ARQ Indicator Channel; PHICH).

For the uplink in radio communication from a mobile station apparatus to a base station apparatus, LTE uses an uplink shared channel (Physical Uplink Shared Channel; PUSCH), an uplink control channel (Physical Uplink Control Channel; PDCCH), and a random access channel (Physical Random Access Channel; PRACH). For the uplink control channel (PUCCH) in LTE, two-step code spread is preformed using a cyclic shift and an orthogonal code sequence in a time domain, and then multiplexing are preformed.

The following are cited as related technical documents.

PRIOR ART DOCUMENTS

Non-Patent Documents

Non-Patent Document 1: 3GPP TS36.211-v8.4.0 (2008 September), Physical Channels and Modulation (Release 8)

Non-Patent Document 2: 3GPP TS36.213-v8.4.0 (2008 September), Physical layer procedures (Release 8)

Non-Patent Document 3: 3GPP TSG RNA 1 #55, Prague, Czech Republic, 10-14 Nov., 2008, R1-084250 "UL MIMO Transmission Schemes in LTE Advanced"

SUMMARY OF THE INVENTION

Problem to be Solved by the Invention

In LTE, transmission on the uplink control channel (PUCCH) is performed with code spread performed using, selectively as one combination, a radio resource, and a cyclic shift and an orthogonal code sequence in the time domain. Nevertheless, in order to use the transmission diversity for the uplink control channel (PUCCH), multiple combinations of a radio resource as well as a cyclic shift and an orthogonal code sequence in the time domain need to be selected for respective transmission antennas, but LTE does not have such a scheme.

An object of the present invention is to provide a radio communication system in which a transmission diversity gain is obtained by using the same channel structure as in LTE to the maximum extent with compatibility taken into consideration for LTE.

Means for Solving the Problem

A communication technique according to the present invention is characterized in that a mobile station apparatus selects multiple combinations of a radio resource, a cyclic shift and an orthogonal code sequence in a time domain, spreads a signal by using the multiple selected radio resources, the cyclic shifts and the orthogonal code sequences in a time domain, and transmits resultant signals through multiple transmission antennas.

According to an aspect of the present invention, there is provided a radio communication system including a plurality of mobile station apparatuses and a base station apparatus, the radio communication system characterized in that the base station apparatus transmits data and downlink allocation information indicating a result of scheduling of the data, each of the mobile station apparatuses receives the downlink allocation information, obtains a plurality of spread codes and a plurality of radio resources in an uplink on the basis of radio resources in a downlink in which the downlink allocation information is received, spreads a pilot signal, which is to be used for compensating propagation paths by the base station apparatus, by using each of the spread codes and transmits the obtained pilot signals by using the plurality of the radio resources in the uplink through a plurality of transmission antennas. Preferably, each mobile station apparatus obtains the same number of spread codes and the same number of radio resources in the uplink as the number of the transmission antennas. Thus, a plurality of spread codes and a plurality of radio resources can be obtained.

Preferably, the radio resources in the downlink are control channel elements which are allocation units of the downlink allocation information, and the mobile station apparatus selects a plurality of numbers on the basis of the numbers of the control channel elements in which the downlink allocation information is received, spreads the pilot signal, to be used for compensating propagation paths, by using each of the plurality of spread codes obtained based on the plurality of numbers, and transmits the pilot signals in the radio resources obtained based on the plurality of numbers through the plurality of transmission antennas. Preferably, the mobile station apparatus spreads an acknowledgement (ACK)/negative acknowledgement (NACK) for response to reception of the data by using each of the plurality of spread codes obtained based on the plurality of numbers, and transmits the resultant acknowledgments (ACK)/negative acknowledgments (NACK) in the radio resources obtained based on the plurality of numbers through the plurality of transmission antennas. Preferably, each of the spread codes is a spread code to be used to perform two-step code spread on a first orthogonal code sequence arranged in a frequency domain by using a cyclic shift and a second orthogonal code sequence in a time domain. Multiple combinations of the radio resource, the cyclic shift and the orthogonal code sequence in the time domain are selected, code spread is performed on the signal by using the selected multiple combinations of the radio resource, the cyclic shift and the orthogonal code sequence in the time domain, and resultant signals are transmitted through the multiple transmission antennas. Thereby, a transmission diversity gain can be obtained.

Preferably, when the second orthogonal code sequence is used for the ACKs/NACKs, a sequence length thereof is 4 and when the second orthogonal code sequence is used for the pilot signals, a sequence length thereof may be 3. The first orthogonal code sequence may have a sequence length of 12, and there may be 12 cyclic shifts, any one of which is selected as the cyclic shift in the time domain. The same orthogonal code sequence may be used as the first orthogonal code sequence for the transmission antennas.

The mobile station apparatus may select two numbers of control channel elements from the numbers of the control channel elements assigned the downlink allocation information. The two numbers of the control channel elements are preferably the lowest number and a number one higher than the lowest number of the numbers of the control channel elements assigned the downlink allocation information.

The base station apparatus may further transmit the downlink allocation information by using the two or more control channel elements, and the mobile station apparatus may further monitor the downlink allocation information through the two or more control channel elements.

Upon receipt of the downlink allocation information in only one of the control channel elements, the mobile station apparatus may further judge whether or not a number of the control channel element in which the downlink allocation information is received is a multiple of a specific value, and based on the judgment, switch between selecting a number one higher than the number of the control channel element in which the downlink allocation information is received and selecting a value one lower than the number of the control channel element.

With the above configuration, the freedom of selection in arranging the downlink allocation information by the base station apparatus is not (hardly) reduced in comparison with LTE.

The mobile station apparatus selects only one of the numbers of the control channel elements in LTE for obtaining a radio resource for an ACK/NACK, while the present invention is based on selection of two of the numbers of the control channel elements. Since selecting the two numbers of the control channel elements at random causes a problem that the base station apparatus cannot arrange the downlink allocation information in some control channel elements, the two numbers are selected based on such a rule that can avoid the restriction as much as possible.

It is preferable that the mobile station apparatus select the numbers in the following manner. When the number of the control channel element in which the downlink allocation information is received is a specific multiple, the mobile station apparatus selects the number of the control channel element in which the downlink allocation information is received and a number one higher than the number of the control channel element. When the number of the control channel element in which the downlink allocation information is received is not the specific multiple, the mobile station apparatus selects the number of the control channel element in which the downlink allocation information is received and a number one lower than the number of the control channel element. Note that the specific multiple is a multiple of 2, 4 or 8.

Preferably, the base station apparatus further notifies the mobile station apparatus of a value for selecting a method for spreading, and the mobile station apparatus selects the numbers of the control channel elements in which the downlink allocation information is received, spreads the pilot signal by using each of the spread codes obtained based on the numbers and the spreading method obtained based on the notified value, and transmits the pilot signal through the plurality of transmission antennas.

The present invention may be a base station apparatus which sends a mobile station apparatus data and downlink allocation information indicating a result of scheduling of the data, characterized in that the base station apparatus receives pilot signals, which are to be used for compensating propagation paths by the base station apparatus and which the mobile station apparatus transmits in a plurality of radio resources in an uplink through a plurality of transmission antennas, after selecting a plurality of spread codes and the plurality of radio resources in the uplink on the basis of radio resources in a downlink in which the downlink allocation information is received, and spreading a pilot signal by using each of the plurality of spread codes, and the base station apparatus performs inverse spread on the received pilot signal, and demultiplxes the pilot signal transmitted through the respective transmission antennas of the mobile station apparatus.

The present invention may be a mobile station apparatus which receives data and downlink allocation information indicating a result of scheduling of the data transmitted by a base station apparatus characterized in that the mobile station apparatus selects a plurality of spread codes and the plurality of radio resources in the uplink on the basis of radio resources in a downlink in which the downlink allocation information is received, spreads a pilot signal, which is to be used for compensating propagation paths by the base station apparatus, by using each of the spread codes and transmits the obtained pilot signals in a plurality of radio resources in an uplink through a plurality of transmission antennas.

According to another aspect of the present invention, there is provided a radio communication method in which a base station apparatus transmits to a mobile station apparatus data and downlink allocation information indicating a result of scheduling of the data, characterized by comprising the steps of: selecting, by the mobile station apparatus, a plurality of spread codes and the plurality of radio resources in the uplink on the basis of radio resources in a downlink in which the downlink allocation information is received; receiving pilot signals which are to be used for compensating propagation paths by the base station apparatus, and which the mobile station apparatus transmits in a plurality of radio resources in an uplink through a plurality of transmission antennas after selecting a plurality of spread codes and the plurality of radio resources in the uplink on the basis of radio resources in a downlink in which the downlink allocation information is received, and spreading a pilot signal by using each of the plurality of spread codes; and performing inverse spread on the received pilot signals, and demultiplexing the pilot signals transmitted through the respective transmission antennas of the mobile station apparatus.

There is also provide a radio communication method in which a mobile station apparatus receives from a base station apparatus data and downlink allocation information indicating a result of scheduling of the data, characterized by comprising the steps performed by the mobile station apparatus of: selecting a plurality of spread codes and the plurality of radio resources in the uplink on the basis of radio resources in a downlink in which the downlink allocation information is received; and spreading a pilot signal, which is to be used for compensating propagation paths by the base station apparatus, by using each of the spread codes, and transmitting the pilot signals in a plurality of radio resources in an uplink through a plurality of transmission antennas.

The present invention may be a program for causing a computer to execute the radio communication methods described above and may be a computer readable medium that stores the program. The program may be acquired through a transmission medium such as the Internet.

The present description includes the content in its entirety described in the description and/or the drawings of Japanese Patent Application No. 2009-014588 which is the base of the priority of this application.

Effect of Invention

The present invention can reduce impacts of complex scheduling and resource allocation resulting from an increase of combinations of used frequency bands.

Figure 1:
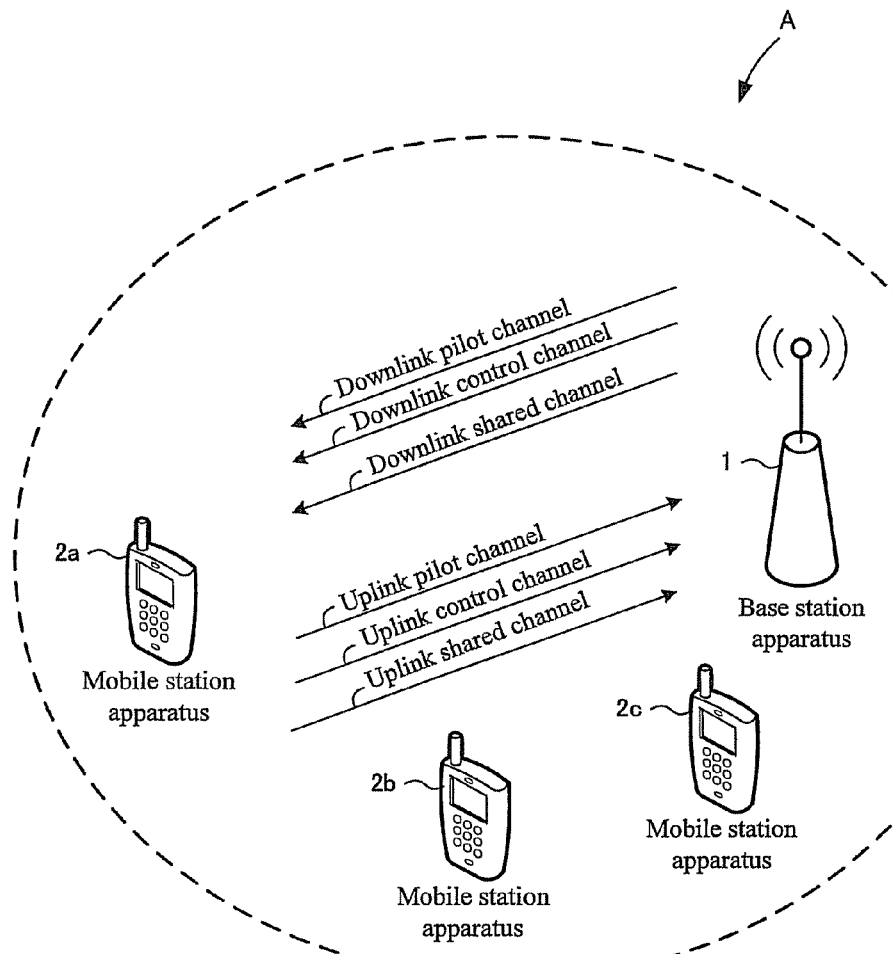
FIG. 1 is a diagram showing a schematic configuration example of channels in embodiments.

EXPLANATION OF THE REFERENCE NUMERALS 1 base station apparatus
2 mobile station apparatus
41 higher layer
41a radio resource controller
43 controller
45n reception antennas
47 reception processor
51 demultiplexer
53 modulation symbol decoder
55 modulation symbol generator
57 multiplexer
61 transmission processor
63m transmission antenna
71 higher layer
71a radio resource controller
73 controller
75l reception antennas
77 reception processor
81 demultiplexer
85 modulation symbol decoder
87 modulation symbol generator
91 multiplexer
93 transmission processor
95k transmission antennas

BEST MODES FOR CARRYING OUT THE INVENTION

A communication technique according to an embodiment of the present invention will be described below with reference to the drawings. A radio communication system according to this embodiment includes a base station apparatus and multiple mobile station apparatuses.

FIG. 1 mentioned above is a diagram showing a schematic configuration example of channels in a radio communication system A according to this embodiment. The base station apparatus 1 performs radio communications with the mobile station apparatuses 2 (three mobile station apparatuses 2a, 2b, and 2c in the figure). In this embodiment, a downlink in radio communication from the base station apparatus 1 to the mobile station apparatuses 2 includes a downlink pilot channel (downlink pilot signal), a downlink control channel (PDCCH), and a downlink shared channel (PDSCH). In addition, in this embodiment, an uplink in radio communication from the mobile station apparatuses 2 to the base station apparatus 1 includes an uplink pilot channel (uplink pilot signal), an uplink control channel (PUCCH), and an uplink shared channel (PUSCH).

(Downlink Radio Frame)

Figure 2:
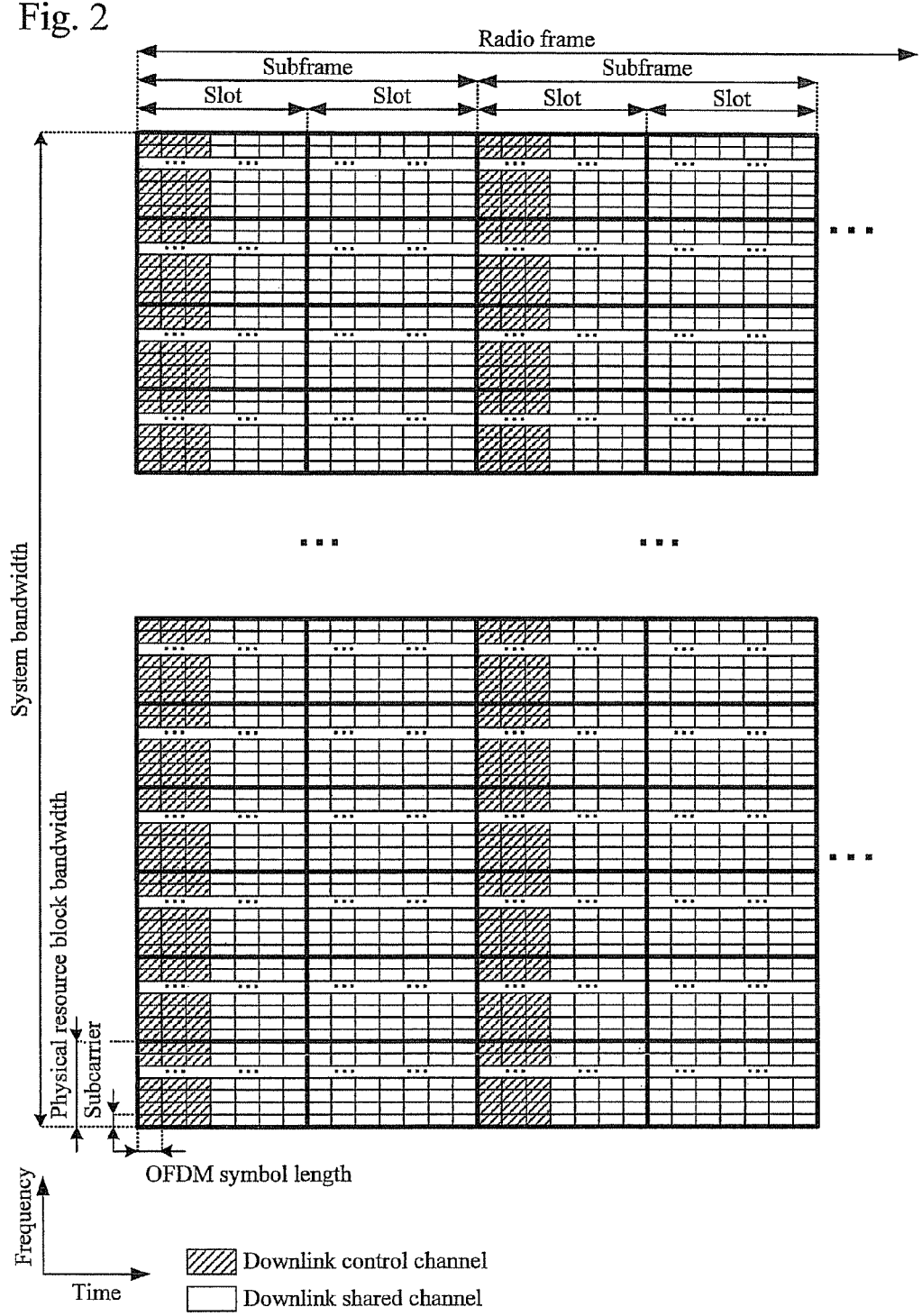
FIG. 2 is a diagram showing a schematic configuration example of a downlink radio frame in the embodiments.

FIG. 2 is a diagram showing a schematic configuration example of a downlink radio frame (downlink radio resource) in this embodiment. In FIG. 2, the horizontal axis represents a time domain, and the vertical axis represents a frequency domain. As shown in FIG. 2, the downlink radio frame is constituted of multiple pairs of physical resource blocks (PRBs) (units surrounded in bold lines in FIG. 2). The pairs of physical resource blocks (PRBs) are units used at the time of radio resource allocation and the like and are each constituted of a frequency band (PRB bandwidth) and a time slot (2 slots=1 subframe) of a predetermined width. Basically, one pair of physical resource blocks (PRBs) is constituted of two physical resource blocks (PRBs) which are contiguous in a time domain (PRB bandwidth×slots).

As shown in FIG. 2, one physical resource block (PRB) is constituted of 12 subcarriers in the frequency domain and by 7 OFDM symbols in the time domain. A system bandwidth is a communication bandwidth of the base station apparatus and constituted of multiple physical resource blocks (PRBs).

In the time domain, the slots each formed by seven OFDM symbols, subframes each formed by two slots, and the radio frames each formed by ten subframes are defined. Note that a unit (minimum unit) formed by one subcarrier and one OFDM symbol is referred to as a resource element (RE). In addition, multiple physical resource blocks (PRBs) are arranged in the downlink radio frame in accordance with the system bandwidth.

At least the downlink control channel (PDCCH), the downlink shared channel (PDSCH), and the downlink pilot channel used for estimating a propagation path for the downlink shared channel (PDSCH) and the downlink control channel (PDCCH) are arranged in each downlink subframe. The downlink control channel (PDCCH) is arranged from the first OFDM symbol in the subframe, and the downlink shared channel (PDSCH) is arranged in the remaining OFDM symbols. The downlink control channel (PDCCH) and the downlink shared channel (PDSCH) are not arranged in the same OFDM symbol. Illustration of the downlink pilot channel is omitted in FIG. 2 for simplicity of explanation, but the downlink pilot channel is arranged in a dispersed manner in the frequency domain and the time domain.

In the downlink shared channel (PDSCH), a 24-bit cyclic redundancy check (hereinafter, referred to as "CRC (Cyclic Redundancy Check)") code is added to data (transport block) to be transmitted in the downlink shared channel (PDSCH), and then the data is transmitted, the CRC code being generated from the data by using a predetermined generating polynomial.

In the downlink control channel (PDCCH), downlink control information (DCI) is transmitted, such as uplink allocation information (uplink grant) and downlink allocation information (downlink grant) which are constituted of a modulation scheme for the uplink shared channel (PUSCH) and the downlink shared channel (PDSCH), a coding scheme, radio resource allocation (RA), HARQ information (redundancy version; RV), new data indicator (NDI) and the like. The downlink shared channel (PDSCH) allocated based on the downlink allocation information and the downlink allocation information are arranged in the same subframe. The uplink shared channel (PUSCH) allocated based on the uplink allocation information is arranged in a subframe at a predetermined later time. In addition, in allocating uplink/downlink radio resources by using the downlink control channel (PDCCH), each mobile station apparatus is identified by using a 16-bit identifier (Radio Network Temporary Identifier; RNTI) uniquely identifiable in the base station apparatus.

Concretely, an exclusive OR between the identifier (RNTI) and the 16-bit cyclic redundancy check (CRC) code is added to the uplink allocation information, the downlink allocation information or the like to be transmitted in the downlink control channel (PDCCH), the CRC code being generated from the uplink allocation information, the downlink allocation information, or the like by using the predetermined generating polynomial. Each mobile station apparatus 2 is notified of the identifier (RNTI) by the base station apparatus 1 when the base station apparatus 1 and the mobile station apparatus 2 start communicating. Upon receipt of the downlink control channel (PDCCH), the mobile station apparatus 2 further exclusively ORes an identifier (RNTI) allocated by the base station apparatus 1 and the information obtained as the exclusive OR between the cyclic redundancy check (CRC) code and the identifier (RNTI), thereby obtaining the original cyclic redundancy check (CRC) code, and then performs the cyclic redundancy check (CRC). This means that the mobile station apparatus 2 decodes no uplink allocation information, downlink allocation information, and the like to which a cyclic redundancy check (CRC) code obtained by using an exclusive OR with an identifier (RNTI) not allocated thereto because the error occurs in the cyclic redundancy check (CRC).

(Configuration of Downlink Control Channel)

The downlink control channel (PDCCH) is constituted of multiple control channel elements (CCEs). Each of the control channel elements (CCEs) is constituted of multiple resource element groups (REGs or mini-CCEs) dispersed in the frequency and time domains, and the resource element groups (REGs) are each constituted of multiple contiguous downlink resource elements (REs) except the downlink pilot signal in the frequency domain having the same OFDM symbol. The control channel element is a unit in which downlink control information (DCI) is arranged.

Figure 3:
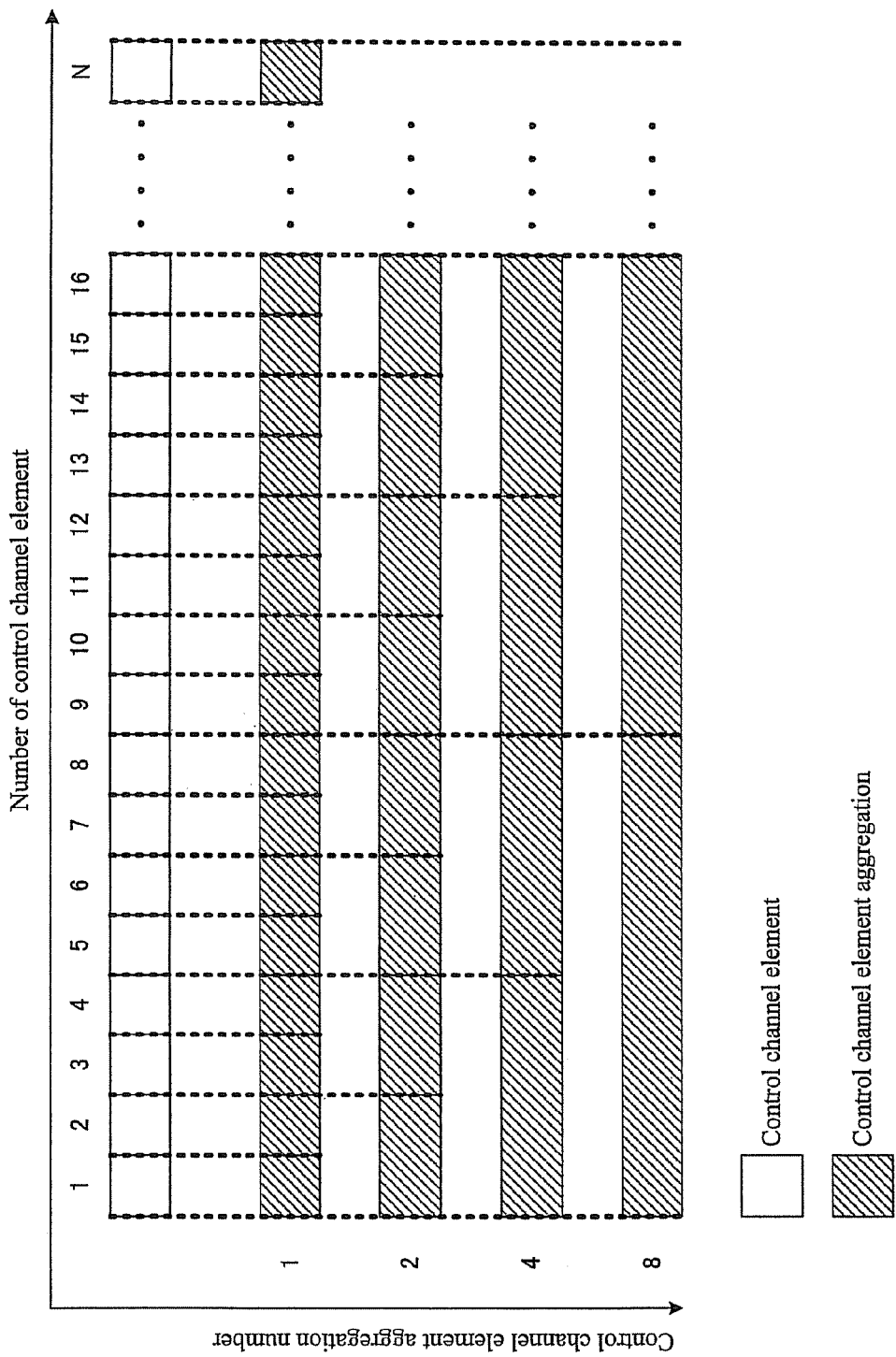
FIG. 3 is a diagram for explaining a physical configuration of the downlink control channel in the embodiments.

FIG. 3 is a diagram for explaining a physical configuration of the downlink control channel in this embodiment. In FIG. 3, the horizontal axis represents the number of control channel element (CCE), and the vertical axis represents a control channel element (CCE) aggregation number (a CCE aggregation number). The number of CCE is a number for identifying each control channel element (CCE). Each of CCE aggregations is constituted of multiple control channel elements (CCEs) having consecutive numbers. The CCE aggregation number shows the number of control channel elements (CCEs) forming the CCE aggregation. FIG. 3 shows a case where the CCE aggregation number is 1, 2, 4, and 8 (hatched portions). Downlink control information (CDI) can be allocated to any of the control channel element aggregations. The mobile station apparatus 2 monitors control channel element aggregation units in each subframe to check whether or not the downlink control information (CDI) addressed thereto is transmitted. In other words, the mobile station apparatus does not know which control channel element aggregation unit is used to transmit the downlink control information addressed thereto, and thus monitors every control channel element aggregation unit for the downlink control information.

(Uplink Radio Frame)

Figure 4:
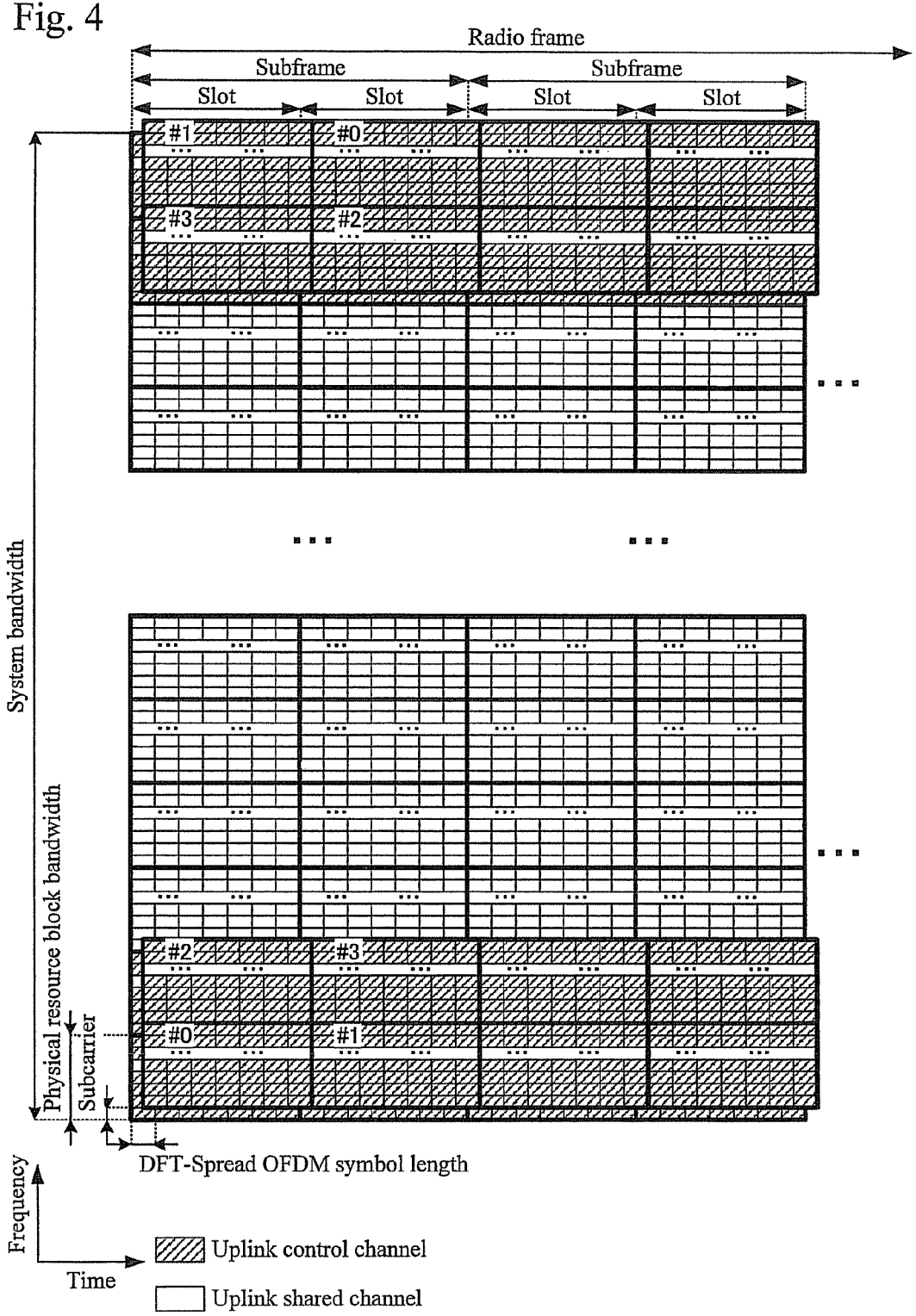
FIG. 4 is a diagram showing a schematic configuration example of an uplink radio frame in the embodiments.

FIG. 4 is a diagram showing a schematic configuration example of an uplink radio frame in this embodiment. In FIG. 4, the horizontal axis represents the time domain, and the vertical axis represents the frequency domain. The uplink radio frame is constituted of multiple pairs of physical resource blocks (PRBs). The pairs of physical resource blocks (PRBs) are units for radio resource allocation and the like and are each constituted of a frequency band (PRB bandwidth) and a time slot (2 slots=1 subframe) of a predetermined width. Basically, one pair of physical resource blocks (PRBs) is constituted of two physical resource blocks (PRBs) which are contiguous in the time domain (PRB bandwidth× slots). One physical resource block (PRB) is constituted of 12 subcarriers in the frequency domain and by 7 DFT-Spread OFDM symbols in the time domain. A system bandwidth is a communication bandwidth of the base station apparatus and constituted of multiple physical resource blocks (PRBs). In the time domain, the slots each constituted of seven DFT-Spread OFDM symbols, subframes each constituted of two slots, and the radio frames each constituted of ten subframes are defined. Note that a unit (minimum unit) constituted of one subcarrier and one DFT-Spread OFDM symbol is referred to as a resource element (RE). In addition, multiple physical resource blocks (PRBs) are arranged in the uplink radio frame in accordance with the system bandwidth.

At least the uplink control channel (PUCCH), the uplink shared channel (PUSCH), and the uplink pilot channel used for estimating a propagation path for the uplink shared channel (PUSCH) and the uplink control channel (PUCCH) are arranged in each uplink subframe. The uplink control channel (PUCCH) is arranged at pairs of physical resource blocks PRB respectively at both ends in the system band width, and the uplink shared channel (PUSCH) is arranged in the remaining pairs of physical resource blocks PRB. The uplink control channel and the uplink shared channel are not transmitted at the same time by the mobile station apparatus. Illustration of the uplink pilot channel is omitted in FIG. 4 for simplicity of explanation, but the uplink pilot channel is time-multiplexed with the uplink shared channel and the uplink control channel.

In the uplink shared channel (PUSCH), a 24-bit cyclic redundancy check (CRC) code is added to data (transport block) to be transmitted in the uplink shared channel (PUSCH), and then the data is transmitted to the base station apparatus, the CRC code being generated from the data by using a predetermined generating polynomial.

In the uplink control channel (PUCCH), uplink control information (UCI) is transmitted, such as a channel quality indicator (CQI), a scheduling request indicator (SRI), an acknowledgement (ACK) indicating that the cyclic redundancy check (CRC) succeeds, and a non-acknowledgement (NACK) indicating that the cyclic redundancy check (CRC) fails. An acknowledgement (ACK) and a non-acknowledgement (NACK) are used for an HARQ (Hybrid Automatic Repeat reQuest). In the HARQ, error control is performed by combining an automatic repeat request (ARQ) and an error correction code such as turbo code. In the HARQ using a chase combining (CC), retransmission of the same packet is requested upon detection of an error in a reception packet. The reception quality is enhanced by combining these two reception packets. In HARQ using incremental redundancy (IR), redundant bits are divided, retransmissions are performed in turn in accordance with the divided bits, and thus encoding ratio is lowered with the increase of retransmission times. Thereby, the error correction capability is enhanced.

Meanwhile, hopping between slots is performed in the uplink control channel (PUCCH), and a physical resource block (PRB) assigned a number #m (m=0, 1, 2, 3) is used for communication in the uplink control channel (PUCCH) in the first slot of a subframe, and a physical resource block (PRB) assigned the same number is also used in the second slot. In addition, two-step code spread with a cyclic shift and an orthogonal code sequence in the time domain is performed on the uplink control information (UCI) transmitted in the uplink control channel (PUCCH). Multiple pieces of uplink control information (UCI) from the multiple mobile station apparatuses 2 (2a, 2b, . . . ) are multiplexed in the same physical resource block (PRB).

(Configuration of Acknowledgement (ACK)/Non-Acknowledgement (NACK))

Figure 5:
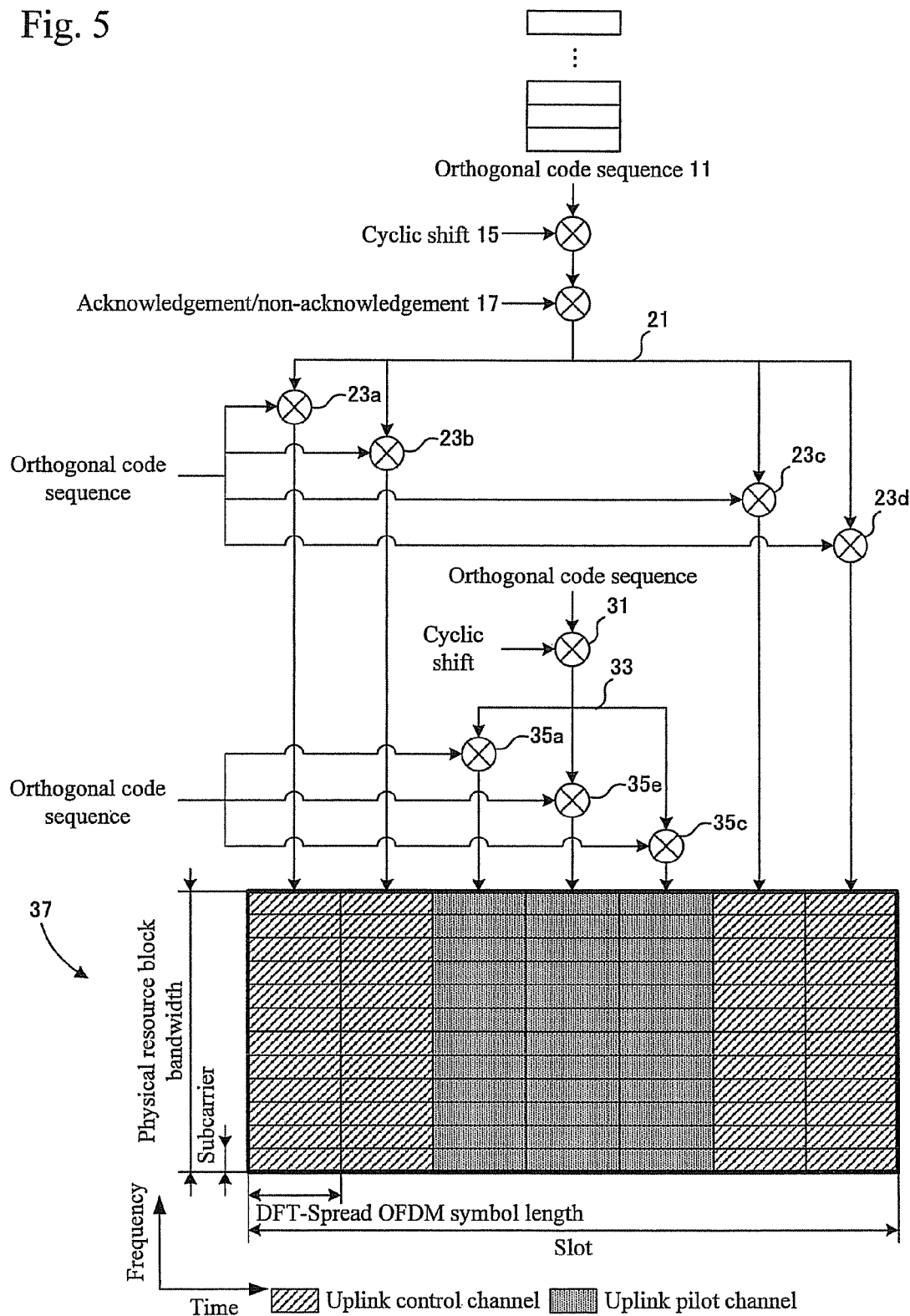
FIG. 5 is a diagram for explaining code spread on an acknowledgement/non-acknowledgement and an uplink pilot channel in the embodiments.

FIG. 5 is a principle diagram for explaining code spread of an acknowledgement (ACK)/non-acknowledgement (NACK) and the uplink pilot channel. In a diagram in a lower part of FIG. 5, the horizontal axis represents the time domain, the vertical axis represents the frequency domain, and reference numeral 37 denotes a single physical resource block (PRB). Each of the mobile station apparatuses 2 (2a, 2b, . . . ) generates an orthogonal code sequence having a sequence length of 12 in the frequency domain. The orthogonal code sequence has a constant amplitude in the time domain and the frequency domain, and a cyclic self correlation value thereof is always 0 (zero auto-correlation) relative to time difference except 0. A cyclic shift sequence is generated by performing a phase rotation on this orthogonal code sequence.

This means that performing the phase rotation and then an IFFT on an orthogonal code sequence 11 leads to a cyclic shift 15 in the time domain. Multiplication of the generated cyclic shift sequence by an acknowledgement (ACK)/non-acknowledgement (NACK) 17 modulated by BPSK or QPSK is performed by a multiplier and the resultant sequence is duplicated to produce four duplications. Then, the duplicated sequences are arranged in the first, second, sixth, and the seventh resource elements, respectively, of DFT-Spread OFDM symbols in a physical resource block (PRB) serially in ascending order of frequency. The four duplicated cyclic shift sequences in the respective resource elements in the time domain are multiplied by the orthogonal code sequence having the sequence length of 4 using multipliers 23a to 23d. In this way, the two-step code spread with the cyclic shift and the orthogonal code sequence in the time domain is performed.

In the case of the uplink pilot channel, a cyclic shift sequence (31) is generated in the same manner as for the acknowledgement (ACK)/non-acknowledgement (NACK), i.e., by performing a phase rotation on an orthogonal code sequence having the sequence length of 12 in the frequency domain. The generated cyclic shift sequence is duplicated to three cyclic shift sequences, the three cyclic shift sequences are arranged in the third, fourth, and the fifth resource elements of the DFT-Spread OFDM symbols in a physical resource block (PRB). In addition, multiplication of the three duplicated cyclic shift sequences by the orthogonal code sequence having the sequence length of 3 is performed by multipliers 35a, 35b, and 35c for the resource elements. Thereby, the two-step code spread with the cyclic shift and the orthogonal code sequence in the time domain is performed. The above processing is performed for each slot while changing each of the orthogonal code sequences in the time domain and the frequency domain and the cyclic shift in the time domain.

For the orthogonal code sequences in the time domain to be multiplied by the uplink pilot channel and the acknowledgement (ACK)/non-acknowledgement (NACK), one of three types is selected. Meanwhile, an amount of phase rotation for the cyclic shift in the time domain is selected every 30 degrees, and thus there are 12 phase rotation amounts. Thus, by combining the cyclic shift in the time domain and the orthogonal code sequence, up to 36 uplink pilot channels and acknowledgements (ACKs)/non-acknowledgements (NACKs) can be code-multiplexed in a single physical resource block (PRB). Alternatively, the amount of phase rotation may be selected every 60 degrees or 90 degrees. In this case, 12 uplink pilot channels and acknowledgements (ACKs)/non-acknowledgements (NACKs) or 18 uplink pilot channels and acknowledgements (ACKs)/non-acknowledgements (NACKs) can be code-multiplexed in a single physical resource block.

First Embodiment

Figure 6:
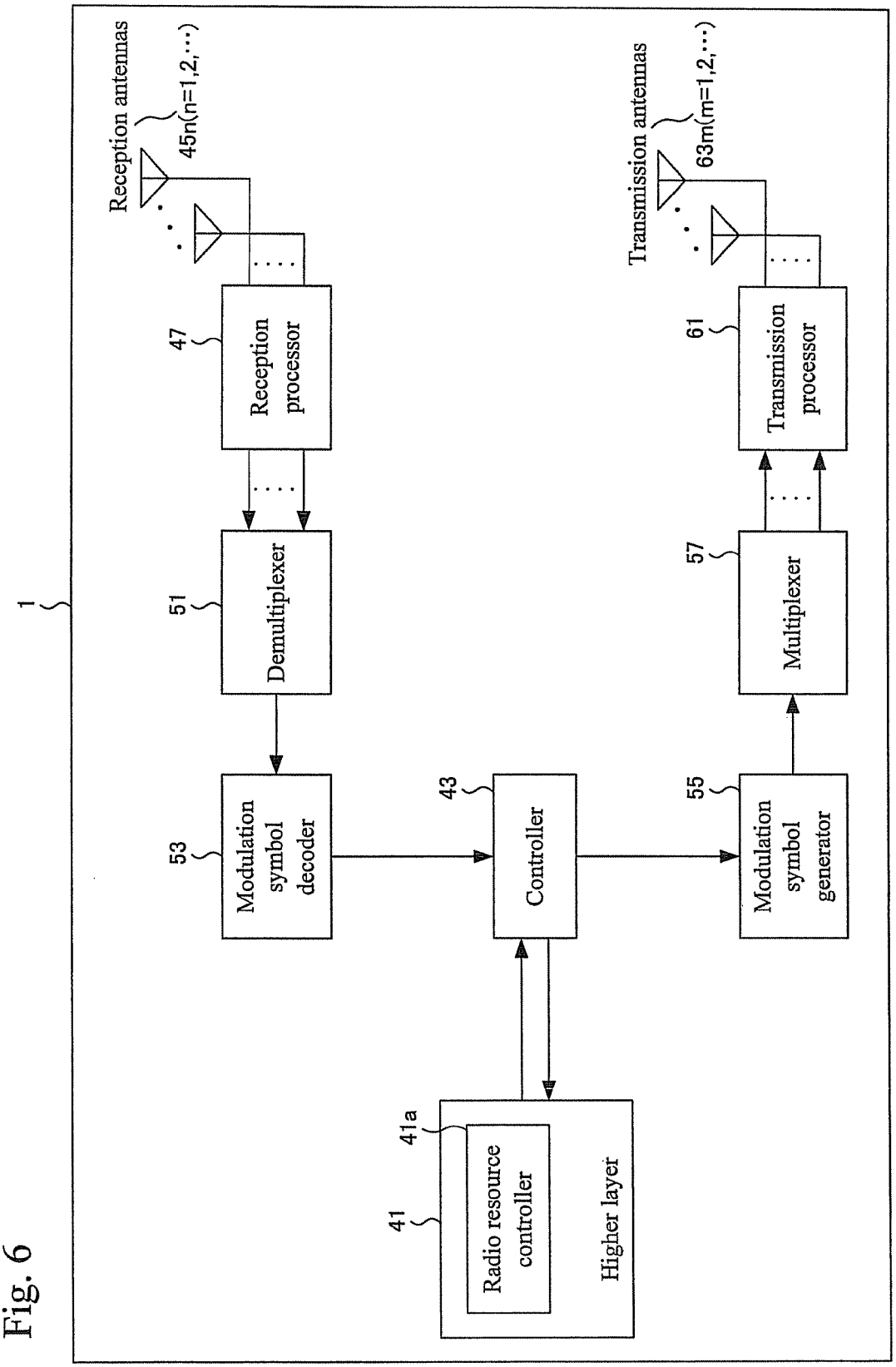
FIG. 6 is a schematic block diagram showing a configuration example of a base station apparatus 1 in the embodiments.

FIG. 6 is a schematic block diagram showing a configuration example of a base station apparatus 1 in this embodiment. As shown in FIG. 6, the base station apparatus 1 includes an higher layer 41, a controller 43, multiple reception antennas 45n (n=1, 2, . . . ), a reception processor 47, a demultiplexer 51, a modulation symbol decoder 53, a modulation symbol generator 55, a multiplexer 57, a transmission processor 61, and multiple transmission antennas 63m (m=1, 2 . . . ). The modulation symbol generator 55, the multiplexer 57, the transmission processor 61, the controller 43, the higher layer 41, and the transmission antennas 63m form a transmitter. In addition, the modulation symbol decoder 53, the demultiplexer 51, the reception processor 47, the controller 43, the higher layer 41, and the reception antennas 45n form a receiver. The higher layer 41 is provided with a radio resource controller 41a.

The modulation symbol generator 55 acquires information to be transmitted in the channels in the downlink from the controller 43, generates a cyclic redundancy check (CRC) code from information to be transmitted in the downlink shared channel (PDSCH), and adds the cyclic redundancy check (CRC) code to the information. In addition, the modulation symbol generator 55 generates a cyclic redundancy check (CRC) code from information to be transmitted in the downlink control channel (PDCCH), adds information obtained as an exclusive OR between an identifier (RNTI) allocated to the mobile station apparatus to which the downlink control channel (PDCCH) is transmitted and the cyclic redundancy check (CRC) code, performs error correction coding on the acquired information and the information to which the cyclic redundancy check (CRC) code is added, on the basis of a control signal inputted from the controller 43, by using a turbo code or a convolutional code, modulates the data subjected to the error correction coding by using a modulation scheme such as quadrature phase shift keying (QPSK), the 16 quadrature amplitude modulation (16QAM), and the 64 quadrature amplitude modulation (64QAM) to generate modulation symbols, and outputs the symbols to the multiplexer 57.

The multiplexer 57 multiplexes the modulation symbol inputted from the modulation symbol generator 55 in a resource element in a subframe in the downlink on the basis of the control signal from the controller 43 and outputs the resource element to the transmission processor 61. The transmission processor 61 performs an inverse fast Fourier transform (IFFT) on the modulation symbols inputted from the multiplexer 57 to perform modulation based on the OFDM scheme, adds a guard interval (GI) to each of the OFDM-modulated OFDM symbols, generates a digital symbol for the baseband, converts the digital signal for the baseband into an analog signal, generates an in-phase component and an orthogonal component of an intermediate frequency from the analog signal, eliminates frequency components unnecessary for the intermediate frequency band, up-converts an intermediate-frequency signal into a high-frequency signal, eliminates unnecessary frequency components, amplifies the power, outputs the signal to a corresponding one of the transmission antennas 63m, and then transmits the signal.

The reception processor 47 amplifies a signal through a corresponding one of the reception antennas 45n, down-converts the signal into the intermediate-frequency signal, eliminates unnecessary frequency components, controls the amplitude level so that the signal level can be maintained appropriately, performs quadrature demodulation on the basis of an in-phase component and an orthogonal component of the received signal, converts the analog signal subjected to the quadrature demodulation into a digital signal, eliminates a portion corresponding to a guard interval from the digital signal, performs a fast Fourier transform on the signal from which the guard interval is eliminated, and performs demodulation using the DFT-Spread OFDM scheme.

Based on a control signal from the controller 43, the demultiplexer 51 extracts an uplink control channel (PUCCH), an uplink shared channel (PUSCH), and an uplink pilot channel from resource elements in the reception signal demodulated by the reception processor 47 using the DFT-Spread OFDM scheme. The demultiplexer 51 performs propagation path compensation on the uplink control channel (PUCCH) and the uplink shared channel (PUSCH) by using the uplink pilot channel to output the channels to the modulation symbol decoder 53.

Based on a control signal from the controller 43, the modulation symbol decoder 53 performs inverse spread on the uplink control channel (PUCCH) inputted from the demultiplexer 51 by using a spread code and an orthogonal code sequence and then decodes the uplink control channel (PUCCH) subjected to the code spread. The modulation symbol decoder 53 also demodulates the uplink control channel (PUCCH) and the uplink shared channel (PUSCH) by using a demodulation scheme such as QPSK, 16QAM, or 64QAM, performs error correction decoding, and then outputs the channels to the controller 43.

The controller 43 performs scheduling (such as an HARQ process, transmission mode selection, and radio resource allocation) and the like on the downlink and the uplink. The controller 43 transmits control signals to the reception processor 47, the demultiplexer 51, the modulation symbol decoder 53, the modulation symbol generator 55, the multiplexer 57, and the transmission processor 61 so as to control these blocks; however, the transmission is not illustrated. Based on a control signal, a scheduling request indicator (SRI) from the mobile station apparatus, an acknowledgement (ACK)/non-acknowledgement (NACK) for the downlink shared channel (PDSCH), and the like which are inputted from the higher layer, the controller 43 performs radio resource allocation to data in the uplink and the downlink, selection processes of the modulation scheme and the coding scheme, retransmission control in HARQ, and generation of control signals used for controlling the blocks. The controller 43 also generates the uplink allocation information and the downlink allocation information indicating scheduling results for the uplink shared channel (PUSCH) and the downlink shared channel (PDSCH) and outputs the information to the modulation symbol generator 55 together with the data which is inputted from the higher layer and is to be transmitted through the downlink. In addition, the controller 43 as necessary processes the information acquired through the uplink inputted from the modulation symbol decoder 53, and then outputs the information to the higher layer.

The higher layer 41 performs processing for a packet data convergence protocol (PDCP) layer, a radio link control (RLC) layer, and a radio resource control (RRC) layer. The higher layer 41 transmits control signals to the controller 43, the reception processor 47, the demulplexer 51, the modulation symbol decoder 53, the modulation symbol generator 55, the multiplexer 57, and the transmission processor 61 to control these blocks. The higher layer 41 includes the radio resource controller 41a. The radio resource controller 41a performs management of various setting information, management of communication states of the mobile station apparatuses, management of buffer states of the mobile station apparatuses, management of identifiers (RNTIs) and the like. In addition, the higher layer 41 performs the cyclic redundancy check (CRC) by using the cyclic redundancy check (CRC) code added to the uplink shared channel (PUSCH), checks for a correctness or an error, generates an acknowledgement (ACK) or a non-acknowledgement (NACK) as a check result, and outputs the acknowledgement (ACK) or non-acknowledgement (NACK) to the controller 43.

Figure 7:
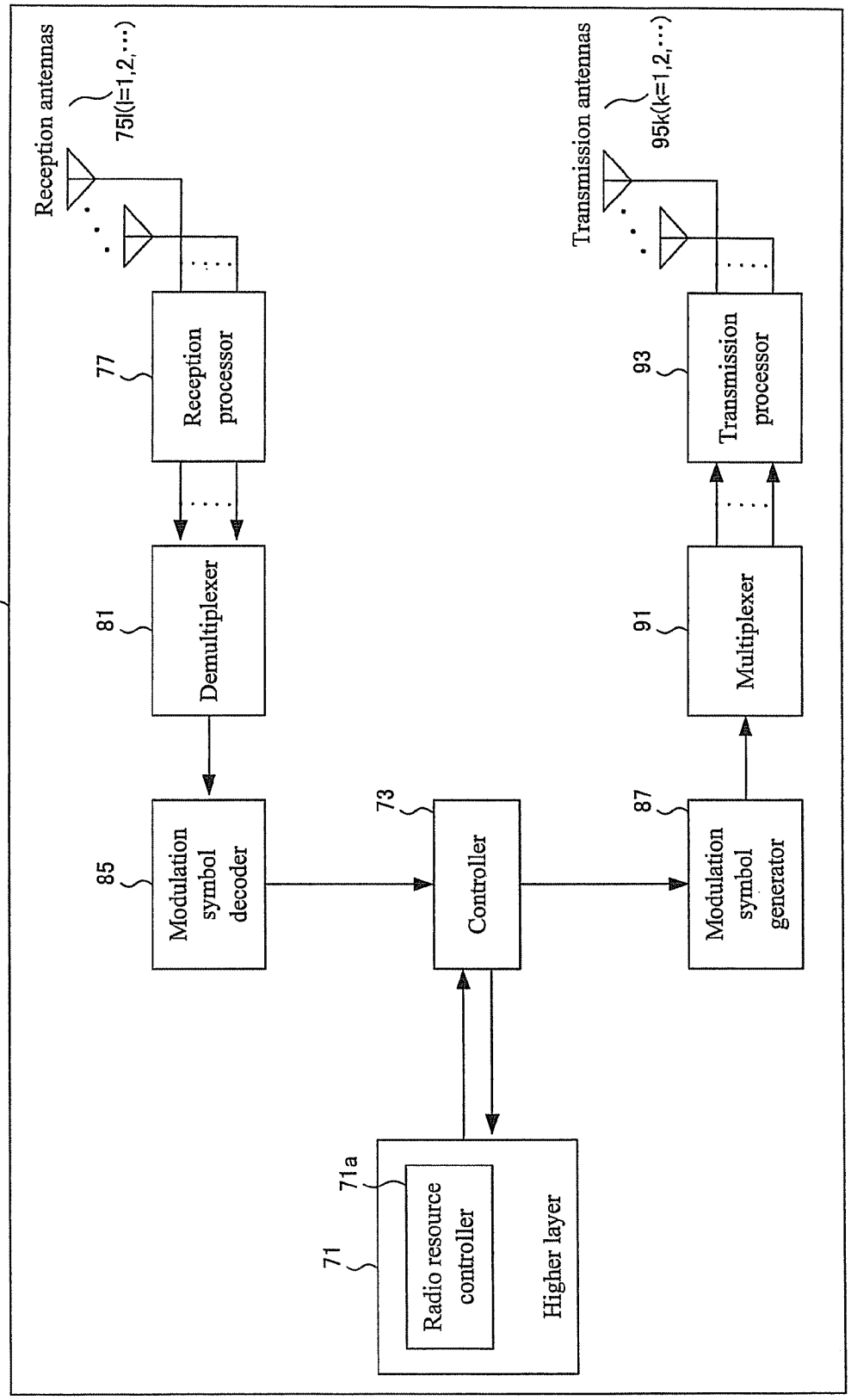
FIG. 7 is a schematic block diagram showing a configuration example of each of mobile station apparatuses 2 in the embodiments.

FIG. 7 is a schematic block diagram showing a configuration example of each of mobile station apparatuses 2 in this embodiment. As shown in FIG. 7, the mobile station apparatus 2 includes an higher layer 71, a controller 73, multiple reception antennas 75l (l=1, 2, . . . ), a reception processor 77, a demultiplexer 81, a modulation symbol decoder 85, a modulation symbol generator 87, a multiplexer 91, a transmission processor 93, and multiple transmission antennas 95$k$ ($k$=1, 2 . . . ). The modulation symbol generator 87, the multiplexer 91, the transmission processor 93, the controller 73, the higher layer 71, and the transmission antennas 95$k$ form a transmitter. In addition, the modulation symbol decoder 85, the demultiplexer 81, the reception processor 77, the controller 73, the higher layer 71, and the reception antennas 75$l$ form a receiver.

The modulation symbol generator 87 acquires information to be transmitted in the channels in the uplink from the controller 73, generates a cyclic redundancy check (CRC) code from information to be transmitted in the uplink shared channel (PUSCH), and adds the cyclic redundancy check (CRC) code to the information. In addition, the modulation symbol generator, on the basis of a control signal inputted from the controller 73, by using a turbo code or a convolutional code, modulates the data subjected to the error correction coding by using a modulation scheme such as QPSK, 16QAM, and 64QAM to generate modulation symbols, and outputs the symbols to the multiplexer. In addition, the uplink control channel (PUCCH) is subjected to the code spread as shown in FIG. 5 and is outputted to the multiplexer 91.

The multiplexer 91 multiplexes the modulation symbols inputted from the modulation symbol generator 87 in a resource element in a subframe in the uplink on the basis of the control signal from the controller 73 and outputs the resource element to the transmission processor 93.

The transmission processor 93 performs an inverse fast Fourier transform (IFFT) on the modulation symbols inputted from the multiplexer 91 to perform modulation based on the DFT-Spread OFDM scheme, adds a guard interval GI to each of the DFT-Spread OFDM-modulated DFT-Spread OFDM symbols, generates a digital symbol for the baseband, converts the digital signal for the baseband into an analog signal, generates an in-phase component and an orthogonal component of an intermediate frequency from the analog signal, eliminates frequency components unnecessary for the intermediate frequency band, up-converts an intermediate-frequency signal into a high-frequency signal, eliminates unnecessary frequency components, amplifies the power, outputs the signal to a corresponding one of the transmission antennas 95$k$, and then transmits the signal.

The reception processor 77 amplifies a signal through a corresponding one of the reception antennas 75$l$, down-converts the signal into the intermediate-frequency signal, eliminates unnecessary frequency components, controls the amplitude level so that the signal level can be maintained appropriately, performs quadrature demodulation on the basis of an in-phase component and an orthogonal component of the received signal, converts the analog signal subjected to the quadrature demodulation into a digital signal, eliminates a portion corresponding to a guard interval from the digital signal, performs a fast Fourier transform on the signal from which the guard interval is eliminated, and performs demodulation using the OFDM scheme.

Based on a control signal from the controller 73, the demultiplexer 81 extracts a downlink control channel (PDCCH), a downlink shared channel (PDSCH), and a downlink pilot channel from resource elements in the reception signal demodulated by the reception processor 77 using the OFDM scheme. Propagation path compensation is performed on the downlink control channel (PDCCH) and the downlink shared channel (PDSCH) by using the downlink pilot channel and the channels are output to the modulation symbol decoder 85.

Based on a control signal from the controller 73, the modulation symbol decoder 85 demodulates the downlink control channel (PDCCH) and the downlink shared channel (PDSCH) inputted from the demultiplexer 81 by using a demodulation scheme such as QPSK, 16QAM, or 64QAM, performs error correction decoding, and then outputs the channels to the controller 73.

The controller 73 performs scheduling (such as an HARQ process, transmission mode selection, and radio resource allocation) and the like on the downlink and the uplink. The controller 73 transmits control signals to the reception processor 77, the demultiplexer 81, the modulation symbol decoder 85, the modulation symbol generator 87, the multiplexer 91, and the transmission processor 93 so as to control these blocks. Based on a control signal, an uplink allocation information and downlink allocation information from the base station apparatus 1, an acknowledgement (ACK)/non-acknowledgement (NACK) for the uplink shared channel, and the like which are inputted from the higher layer 71, the controller 73 performs radio resource allocation to data in the uplink and the downlink, selection processes of the modulation scheme and the coding scheme, retransmission control in HARQ, and generation of control signals used for controlling the blocks. The controller 73 also outputs the information which is inputted from the higher layer and is to be transmitted in the uplink to the modulation symbol generator 87. In addition, the controller 73 as necessary processes the information acquired through the downlink inputted from the modulation symbol decoder 85, and then outputs the information to the higher layer 71.

The higher layer 71 performs processing for a packet data convergence protocol (PDCP) layer, a radio link control (RLC) layer, and a radio resource control (RRC) layer. The higher layer 71 transmits control signals to the controller 73, the reception processor 77, the demulplexer 81, the modulation symbol decoder 85, the modulation symbol generator 87, the multiplexer 91, and the transmission processor 93 to control these blocks. The higher layer 71 includes a radio resource controller 71$a$. The radio resource controller 71$a$ performs management of various setting information, management of communication states of the mobile station apparatuses, management of buffer states of the mobile station apparatuses, management of identifiers (RNTIs) and the like. In addition, the higher layer 71 performs the cyclic redundancy check (CRC) by using the cyclic redundancy check (CRC) code added to the downlink shared channel (PDSCH), checks for a correctness or an error, generates an acknowledgement (ACK) or a non-acknowledgement (NACK) as a check result of the cyclic redundancy check (CRC) on the downlink shared channel (PDSCH), and outputs the acknowledgement (ACK) or non-acknowledgement (NACK) to the controller 73.

Hereinabove, the description has been given of the configurations and the overviews of the base station apparatus 1 and each mobile station apparatus 2. Hereinbelow, a further detailed description is given of this embodiment.

The base station apparatus 1 transmits the data addressed to the mobile station apparatus 2 in a downlink shared channel (PDSCH), and transmits the downlink allocation information indicating the scheduling result for the downlink shared channel (PDSCH) in a downlink control channel (PDCCH) in the same subframe as that for the downlink shared channel (PDSCH) transmission.

The mobile station apparatus 2 monitors control channel element aggregations of the downlink control channel for each subframe. Upon succeeding in demodulation, decoding, and cyclic redundancy check (CRC) of the downlink allocation information, the mobile station apparatus 2 extracts the downlink shared channel (PDSCH) in the same subframe as that for the decoding of the downlink allocation information in accordance with the downlink allocation information, and performs demodulation, decoding, and cyclic redundancy check (CRC). Upon succeeding in cyclic redundancy check of the downlink shared channel (PDSCH), the mobile station apparatus 2 generates an acknowledgement (ACK). Upon failure thereof, the mobile station apparatus 2 generates a non-acknowledgement (NACK).

In order to transmit the acknowledgement (ACK)/non-acknowledgement (NACK) by using the transmission diversity, the mobile station apparatus 2 performs the processing described with FIG. 5 and generates as many signals as the transmission antennas, the signals being obtained by spreading codes of the acknowledgement (ACK)/non-acknowledgement (NACK) and the uplink pilot signal. FIG. 5 shows the use of the same orthogonal code sequence in the frequency domain in the transmission antennas and different orthogonal code sequences among the slots. In addition, the combination of the physical resource block (PRB) in which the acknowledgement (ACK)/non-acknowledgement (NACK) is arranged, an amount of cyclic shift given to the orthogonal code sequence in the frequency domain, and the orthogonal code sequence in the time domain to be multiplied by resource elements for the uplink control channel (PUCCH) and the uplink pilot channel is designed to be different among transmission antennas. The mobile station apparatus 2 arranges the signals subjected to the code spread using the different spread codes in physical resource blocks corresponding to the signals, and transmits the signals through the transmission antennas corresponding to the signals.

The combinations, used by the transmission antennas, of the physical resource block (PRB), the amount of cyclic shift and the orthogonal code sequence in the time domain for the acknowledgement (ACK)/non-acknowledgement (NACK) and the uplink pilot channel are uniquely determined in the following manner. Specifically, the number of a control channel element (CCE) used for transmitting downlink allocation information indicating a scheduling result for the downlink shared channel (PDSCH) corresponding to the acknowledgement (ACK)/non-acknowledgement (NACK) is added to an offset value broadcasted by the base station apparatus 1, and the obtained value is inputted in a corresponding function. Inputting a different number of CCE into the function leads to a different combination of the physical resource block (PRB), the cyclic shift amount and the orthogonal code sequence in the time domain.

By referring to FIG. 3, a description is given below of how to select the numbers of control channel elements for obtaining the combinations, to be applied to the transmission antennas, of the physical resource block (PRB), the cyclic shift amount and the orthogonal code sequence in the time domain in transmitting acknowledgements (ACKs)/non-acknowledgements (NACKs) through two transmission antennas using different combinations of the physical resource block (PRB), the cyclic shift amount and the orthogonal code sequence in the time domain.

The mobile station apparatus 2 selects the lowest number of CCE and the second lowest number of CCE (one higher than the lowest number of CCE) of the control channel elements (CCEs) in which downlink allocation information is detected, and obtains two combinations, to be applied to the transmission antennas, of a physical resource block (PRB), a cyclic shift amount and an orthogonal code sequence in the time domain, on the basis of values obtained by respectively adding the two numbers of CCEs to an offset value broadcasted by the base station apparatus 1.

A description is given of, in applying the combinations of the physical resource block (PRB), the cyclic shift amount and the orthogonal code sequence in the time domain to the transmission antennas, how the combinations of the physical resource block (PRB), the cyclic shift amount and the orthogonal code sequence in the time domain are concretely obtained based on the values obtained by adding the offset value broadcasted by the base station apparatus 1 and applied to the antennas.

FIG. 3 shows that each control channel element aggregation is constituted of control channel elements above the control channel element aggregation.

Specifically, it is shown that the leftmost control channel element aggregation having the number of 1 in FIG. 3 is constituted of a control channel element 1, the leftmost control channel element aggregation having the number of 2 in FIG. 3 is constituted of the control channel element 1 and a control channel element 2, the leftmost control channel element aggregation having the number of 4 in FIG. 3 is constituted of the control channel elements 1 and 2 and control channel elements 3 and 4, and the leftmost control channel element aggregation having the number of 8 in FIG. 3 is constituted of the control channel elements 1, 2, 3, and 4 and control channel elements 5, 6, 7, and 8.

For example, suppose a case where downlink allocation information is detected in the control channel elements (CCEs) having the numbers of CCEs of 5, 6, 7, and 8. In this case, values are obtained by adding the offset value broadcasted by the base station apparatus 1 to 5 and 6 which are the lowest number of CCE and the second lowest number of CCE of the numbers 5 to 8. Then, combinations of the physical resource block (PRB), the cyclic shift amount and the orthogonal code sequence in the time domain code sequence are obtained based on the values and applied to the transmission antennas.

The following shows an example of a method of obtaining a combination of a physical resource block (PRB), a cyclic shift amount and an orthogonal code sequence in the time domain from the number of CCE selected by the mobile station apparatus. Note that since inclusion of CQI in expressions makes the expressions complicated, simplified expressions are used for the explanation on the assumption that the uplink control channel (PUCCH) includes only an acknowledgement (ACK)/non-acknowledgement (NACK).

The mobile station apparatus obtains a first value
$n_{PUCCH}^{(1)}$
from Formula (1) shown below.
The first term on the right side
$n_{CCE}$
is the number of a control channel element selected by the mobile station apparatus, and the second term on the right side
$N_{PUCCH}^{(1)}$
is a value broadcasted by the base station apparatus.

[Formula 1]

$$n_{PUCCH}^{(1)} = n_{CCE} + N_{PUCCH}^{(1)} \quad (1)$$

Next, the mobile station apparatus obtains a second value m for obtaining a physical resource block (PRB) on the basis of Formula (2) shown below. The parentheses on the right side in Formula 2 represent a floor function, and the denominator of the fraction on the right side
$N_{ACK/NACK}^{RB}$
represents the number of acknowledgements (ACKs)/non-acknowledgements (NACKs) which can be code-multiplexed in a single physical resource block (PRB).

[Formula 2]

$$m = \left\lfloor \frac{n^{(1)}_{PUCCH}}{N^{RB}_{ACK/NACK}} \right\rfloor \quad (2)$$

Next, the mobile station apparatus obtains a third value $n'(n_s)$ for obtaining a cyclic shift and an orthogonal code sequence in the time domain on the basis of Formula (3). A modulo operator is represented by "mod" in Formula 3. A value $n_s$ represents the number (0, 1, 2, ..., or 19) of a slot within a radio frame. A function of $c(\bullet)$ represents a function of a random number to be generated using a value in the parentheses as a seed.

[Formula 3]

$$n'(n_s) = \begin{cases} \{n^{(1)}_{PUCCH} \bmod N^{RB}_{ACK/NACK} & n_s \bmod 2 = 0 \\ [c(n'(n_s-1)+1)] \bmod (N^{RB}_{ACK/NACK}+1) - 1 & n_s \bmod 2 = 1 \end{cases} \quad (3)$$

For example, suppose a case where the mobile station apparatus selects 5 as the number of CCE, and where the base station apparatus broadcasts $N^{(1)}_{PUCCH}$ as 20. If $N^{RB}_{ACK/NACK}$ is 12, the mobile station apparatus calculates $n^{(1)}_{PUCCH}$ as 25 based on Formula (1) and calculates m as 2 based on Formula (2). When m is 2, the mobile station apparatus selects the leftmost physical resource block assigned the number #2 in the subframe in FIG. 4. In addition, based on the expression in the upper portion of the right side of Formula (3), the mobile station apparatus calculates $n'(n_s)$ as 1 in a case of an even slot number. By using a number $n'(n_s-1)$ which is one smaller than that of the slot in the expression in the lower portion of the right side of Formula (3), the mobile station apparatus calculates $n'(n_s)$ in a case of an odd slot number. In addition, based on $n'(n_s)$, the mobile station apparatus obtains a cyclic shift and an orthogonal code sequence in the time domain.

Note that the mobile station apparatus monitors the downlink control channel for multiple cases where the number of the control channel elements is 1, 2, 4, 8, or the like. It is the base station apparatus that determines how many control channel elements are used to transmit the downlink control channel. The mobile station apparatus monitors the downlink control channel, and, as a result, detects the downlink allocation information in a single control channel element or multiple control channel elements.

The detection in a single control channel element leads to only one control channel element number, and thus does not fall under the scope of the present invention.

In addition, the reason why the lowest number is selected is that the lowest number is selected in LTE, and thus it is better to use the same one. Since a terminal in compliance with LTE-A is capable of performing radio communication with a base station in compliance with LTE as well, change is not particularly required unless there is an advantage.

The second lowest number is selected because the same one can be easily selected in the control channel element aggregation number 2, 4, or 8. What is required is to select only two numbers of control channel elements in the control channel element aggregation. Thus, a combination of the lowest number and the highest number or the like may be employed.

When the downlink allocation information is detected in a single control channel element, there is only one number of CCE, and thus only one combination of the physical resource block (PRB), the cyclic shift amount and the orthogonal code sequence in the time domain is obtained. This means that the transmission diversity cannot be used. Thus, when the mobile station apparatus transmits the uplink control channel (PUCCH) by using the transmission diversity, the base station apparatus 1 transmits the downlink allocation information in only a CCE aggregation having the number of CCE aggregation number of 2 or more, and the mobile station apparatus 2 monitors CCE aggregations having the number of CCE aggregation number of 2 or more for the downlink allocation information.

The base station apparatus 1 receives acknowledgements (ACKs)/non-acknowledgements (NACKs) and uplink pilot channels transmitted through the transmission antennas of the mobile station apparatus 2, performs inverse spread thereon, and performs demultiplexing, demodulation, and decoding on the acknowledgements (ACKs)/non-acknowledgements (NACKs) and uplink pilot channels.

Figure 8:
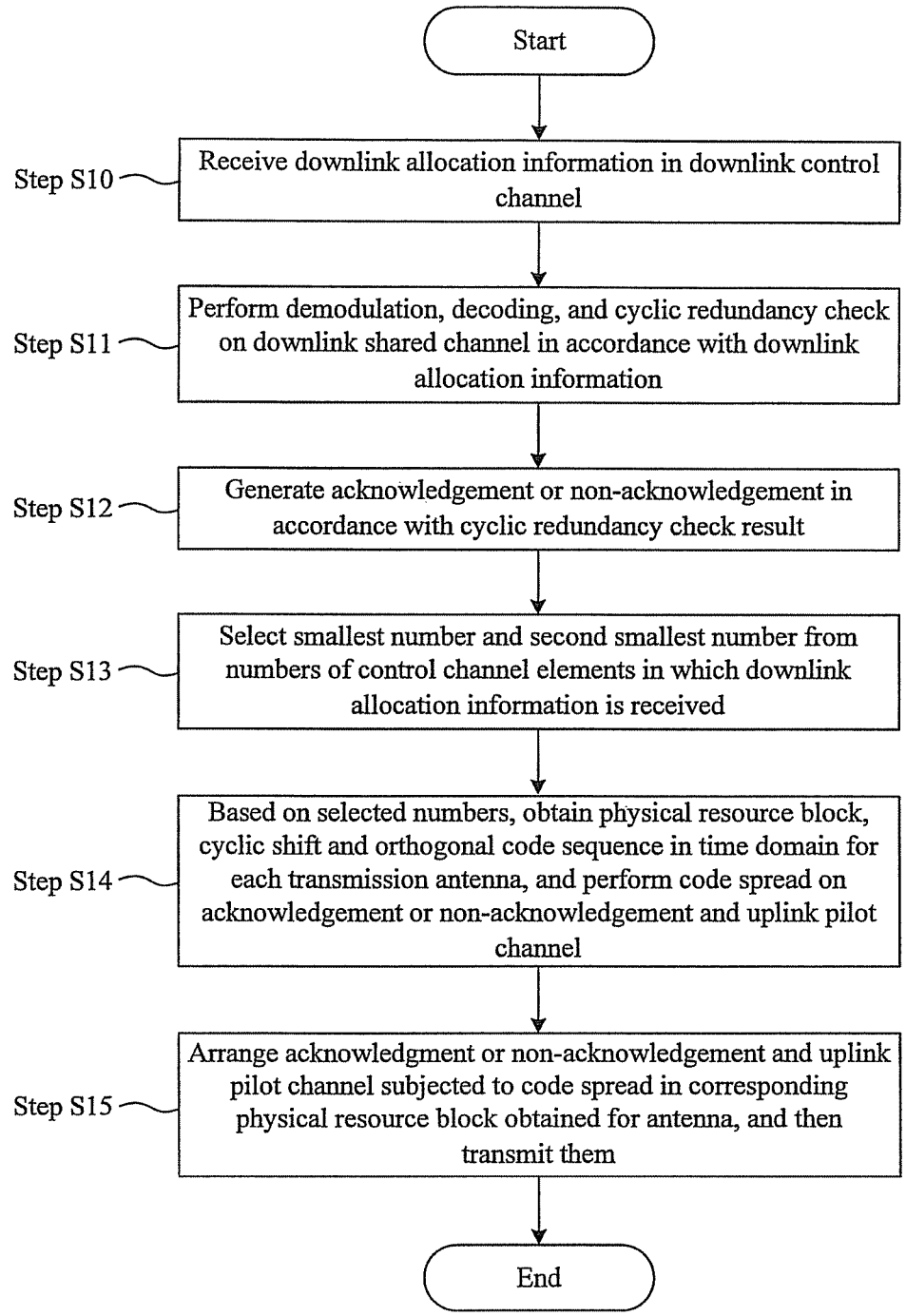
FIG. 8 is a flowchart showing a processing flow of the mobile station apparatus 2 in a first embodiment of the present invention.

FIG. 8 is a flowchart showing a processing flow of the mobile station apparatus 2 in the first embodiment of the present invention. The mobile station apparatus 2 receives downlink allocation information from a base station apparatus in a downlink control channel (PDCCH) (Step S10). Next, the mobile station apparatus 2 performs demodulation, decoding, and cyclic redundancy check (CRC) on the downlink shared channel (PDSCH) in accordance with the downlink allocation information received in Step S10 (Step S11). Next, the mobile station apparatus 2 generates an acknowledgement (ACK) or a non-acknowledgement (NACK) in accordance with the result of the cyclic redundancy check (CRC) in Step S12 (Step S12). Next, the mobile station apparatus 2 selects the lowest number and the second lowest number of the numbers of the control channel elements (CCEs) in which the downlink allocation information is received (Step S13). Next, based on each of the selected numbers, the mobile station apparatus 2 obtains a physical resource block (PRB), a cyclic shift and an orthogonal code sequence in the time domain for each transmission antenna, and performs code spread on the acknowledgement (ACK) or the non-acknowledgement (NACK) and the uplink pilot channel (Step S14). Next, the mobile station apparatus 2 arranges the acknowledgment (ACK) or the non-acknowledgement (NACK) and the uplink pilot channel subjected to the code spread in the corresponding physical resource block (PRB) obtained for the antenna, and then transmits them to the base station apparatus (Step S15).

For example, when the downlink allocation information is detected in control channel elements (CCEs) having the numbers of CCEs of 5, 6, 7, and 8 in Step S10, 5 and 6 which are the lowest number of CCE and the second lowest number of CCE are selected in Step S13, and a physical resource block (PRB), a cyclic shift and an orthogonal code sequence in the time domain are obtained based on the selected numbers 5 and 6 for each transmission antenna in Step S14.

As described above, use the communication technique according to the first embodiment of the present invention makes it possible to obtain the transmission diversity gain by using the same channel structure as that in LTE in the following manner. Specifically, each of the mobile station apparatuses 2 (*a* to *c*) selects multiple combinations of a radio resource, a cyclic shift and an orthogonal code sequence in the time domain, performs code spread on a signal by using the selected multiple radio resource, a cyclic shift and an orthogonal code sequence in the time domain, and transmits the signals through the multiple transmission antennas.

Meanwhile, the reason of using the same channel structure as that in LTE is that there is an advantage that an ACK/NACK of the mobile station apparatuses in compliance with LTE and LTE-A can be code-multiplexed in the same physical resource block without any restrictions. Other transmission diversity methods have restrictions on the code multiplexing and thus have the reduced number of signals which can be code-multiplexed. Alternatively, if a completely new acknowledgement (ACK)/non-acknowledgement (NACK) structure is employed, there arises a problem that the ACKs/NACKs in LTE and LTE-A cannot be code-multiplexed in the same physical resource block (PRB), or the like.

Second Embodiment

Next, a description is given of communication technique according to a second embodiment of the present invention. This embodiment is characterized in that one of the mobile station apparatuses 2 (for example, 2*a*) avoids selecting the same number as those by the other mobile station apparatuses 2 in the following manner in addition to the first embodiment. Specifically, the mobile station apparatus 2 receives downlink allocation information in a single control channel element (CCE), selects the number of the control channel element (CCE) in which the downlink allocation information is received, further judges whether the number of the control channel element (CCE) in which the downlink allocation information is received is a multiple of a specific value, and switches between selecting a number one higher than the number of the control channel element (CCE) in which the downlink allocation information is received and selecting a number one lower. Thereby, a combination of a physical resource block (PRB), a cyclic shift and an orthogonal code sequence in the time domain which are used for an acknowledgement (ACK)/negative acknowledgement (NACK) and an uplink pilot channel can be made different from those in the other mobile station apparatuses 2 (for example, 2*b* and 2*c*). Since the configurations of a base station apparatus 1 and the mobile station apparatuses 2 in the second embodiment are the same as those in the first embodiment (FIG. 6 and FIG. 7), illustrations thereof will be omitted.

By referring to FIG. 3, a description is given of how each mobile station apparatus 2 selects two numbers of control channel elements (CCEs) for obtaining a physical resource block (PRB), a cyclic shift amount and an orthogonal code sequence in the time domain which are used for the acknowledgement (ACK)/negative acknowledgement (NACK) and an uplink pilot channel in the second embodiment.

1) Upon receipt of the downlink allocation information in control channel element (CCE) having an odd number, i.e., a number which is not a multiple of 2, the mobile station apparatus 2 selects the number of the control channel element (CCE) in which the downlink allocation information is received and a number one higher than the number of the control channel element (CCE). 2) Upon receipt of the downlink allocation information in a control channel element (CCE) having an even number, i.e., a number which is the multiple of 2, the mobile station apparatus 2 selects the number of the control channel element (CCE) in which the downlink allocation information is received and a number one lower than the number of the control channel element (CCE).

For example, upon receipt of the downlink allocation information in a control channel element (CCE) having the odd number such as No. 1, No. 3, No. 5, or No. 7, the mobile station apparatus selects a number one higher than the CCE number, such as No. 2, No. 4, No. 6, or No. 8. Upon receipt of the downlink allocation information in a control channel element (CCE) having the even number such as No. 2, No. 4, No. 6, or No. 8, the mobile station apparatus selects a number one lower than the CCE number, such as No. 1, No. 3, No. 5, or No. 7.

Instead of the method of switching the selection based on whether or not the control channel element number is the multiple of 2, the mobile station apparatus 2 may switch the selection based on whether or not the number is a multiple of 4 or a multiple of 8. Specifically, upon receipt of the downlink allocation information in a control channel element (CCE) having a number which is not the multiple of 4, the mobile station apparatus 2 may select the number of the control channel element (CCE) in which the downlink allocation information is received and a number one higher than the number of the control channel element (CCE). Upon receipt of the downlink allocation information in a control channel element (CCE) having a number which is the multiple of 4, the mobile station apparatus 2 may select the number of the control channel element (CCE) in which the downlink allocation information is received and a number one lower than the number of the control channel element (CCE).

Alternatively, upon receipt of the downlink allocation information in a control channel element (CCE) having a number which is not the multiple of 8, the mobile station apparatus 2 may select the number of the control channel element (CCE) in which the downlink allocation information is received and a number one higher than the number of the control channel element (CCE). Upon receipt of the downlink allocation information in a control channel element (CCE) having a number which is the multiple of 8, the mobile station apparatus 2 may select the number of the control channel element (CCE) in which the downlink allocation information is received and a number one lower than the number of the control channel element (CCE).

Figure 9:
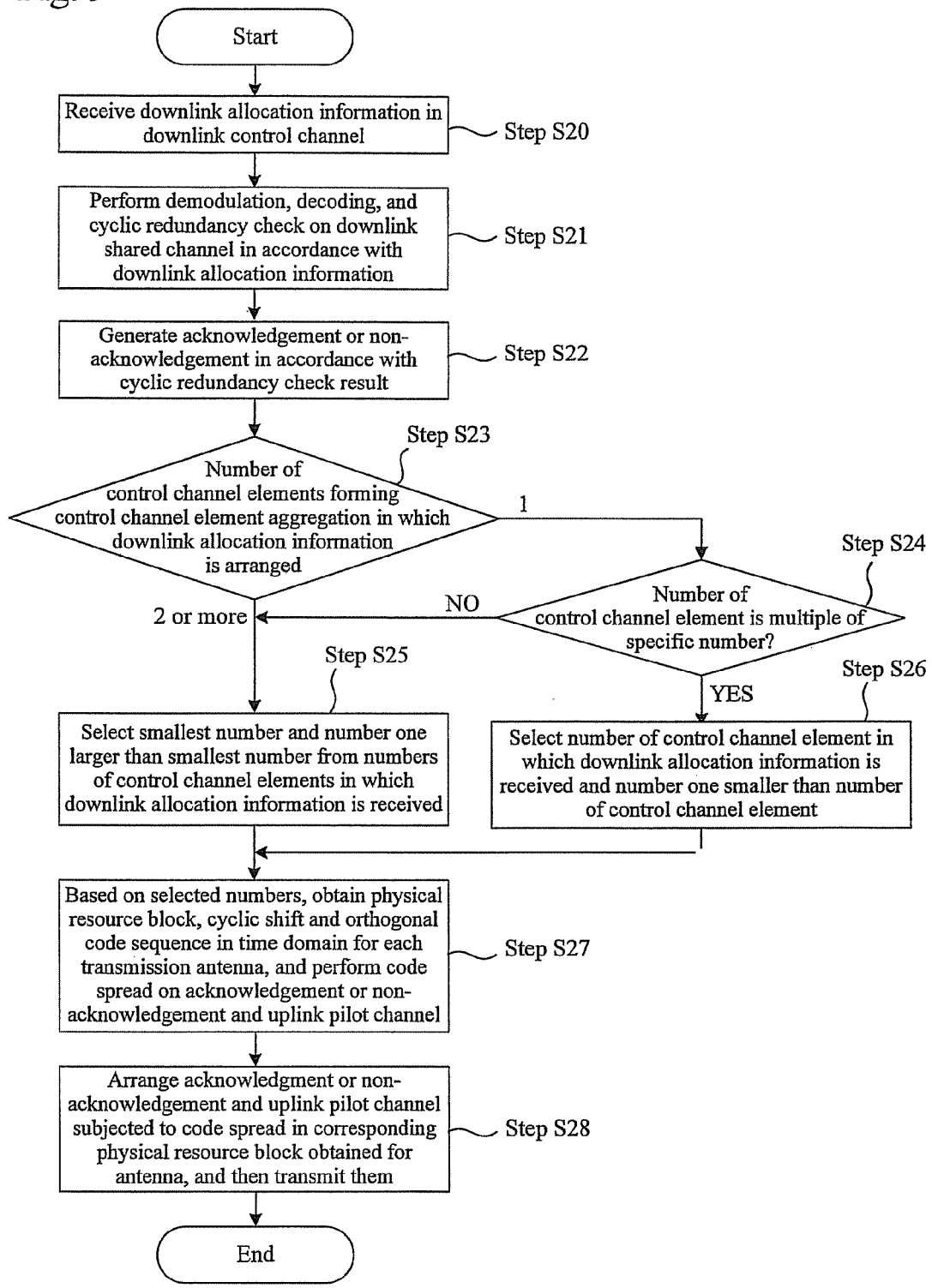
FIG. 9 is a flowchart showing a processing flow of the mobile station apparatus 2 in a second embodiment of the present invention.

FIG. 9 is a flowchart showing a processing flow of the mobile station apparatus 2 in a second embodiment of the present invention. Firstly, the mobile station apparatus 2 receives downlink allocation information from the base station apparatus in the downlink control channel (PDCCH) (Step S20). Next, the mobile station apparatus 2 performs demodulation, decoding, and cyclic redundancy check (CRC) on the downlink shared channel (PDSCH) in accordance with the received downlink allocation information (Step S21). Next, the mobile station apparatus 2 generates an acknowledgement (ACK) or a non-acknowledgement (NACK) in accordance with a result of the cyclic redundancy check (CRC) (Step S22). Next, the mobile station apparatus 2 judges the number of control channel elements (CCEs) forming a CCE aggregation in which the downlink allocation information is arranged (Step S23). If the number of control channel elements (CCEs) is 2 or more (2 or more in Step S23), the mobile station apparatus 2 selects the lowest number and a number one higher than the lowest number of the numbers of the control channel elements (CCEs) in which the downlink allocation information is received (Step S25). Next, based on the selected numbers, the mobile station apparatus 2 obtains a physical resource block (PRB), a cyclic shift and an orthogonal code sequence in the time domain for each transmission antenna, and performs code spread on the acknowledgement (ACK) or the non-acknowledgement (NACK) and the uplink pilot channel (Step S27).

Next, the mobile station apparatus 2 arranges the acknowledgment (ACK) or the non-acknowledgement (NACK) and the uplink pilot channel subjected to the code spread in the corresponding physical resource block (PRB) obtained for the antenna, and then transmits them to the base station apparatus (Step S28). If the number of control channel elements (CCEs) is 1 in Step S23 (1 in Step S23), the mobile station apparatus 2 further judges whether or not the number of CCE is a multiple of a specific number (Step S24). If the multiple of the control channel element (CCE) is the multiple of the specific number (S24—Yes), the mobile station apparatus 2 selects the number of the control channel element (CCE) in which the downlink allocation information is received and a number one lower than the number (Step S26) and proceeds to Step S27. If the multiple of the control channel element (CCE) is the multiple of the specific number (S24—No), the mobile station apparatus 2 proceeds to Step S25.

Note that the specific number is such a number as 2, 4, or 8 and is one of the numbers which are the same as the control channel element aggregation numbers, except 1. Which one of 2, 4, and 8 is to be used should be determined in advance.

The base station apparatus has not transmitted the downlink allocation information to the mobile station apparatus yet, but does not use the control channel element (CCE) having the number selected by the mobile station apparatus to transmit the downlink allocation information to any of the other mobile station apparatuses 2. In the event that the base station apparatus transmits the downlink allocation information through the control channel element (CCE) having such a number, the multiple mobile station apparatuses 2 select the same number of the control channel element (CCE), and thus each transmit an acknowledgement (ACK)/negative acknowledgement (NACK) and an uplink pilot channel by using the same physical resource block (PRB), cyclic shift and orthogonal code sequence in the time domain. This causes an interference.

However, a transmission power command and downlink allocation information or uplink allocation information indicating a result of scheduling for a downlink shared channel (PDSCH) which do not require transmission of an acknowledgement (ACK)/negative acknowledgement (NACK) do not cause the problem as above, and thus can be arranged in the control channel element (CCE) having the number selected by the mobile station apparatus 2.

As described above, with the communication technique according to the second embodiment of the present invention, even when the mobile station apparatus 2 receives the downlink allocation information in a single control channel element (CCE), the mobile station apparatus 2 selects multiple combinations of a radio resource, a cyclic shift and an orthogonal code sequence in the time domain, performs code spread on a signal by using the multiple combinations of the radio resource, the cyclic shift and the orthogonal code sequence in the time domain, and transmits resultant signals through multiple transmission antennas. Thereby, the transmission diversity gain can be obtained without newly reserving a radio resource in such a manner as to avoid imposing a restriction on the arrangement of the downlink allocation information as much as possible.

Third Embodiment

Next, a description is given of a third embodiment of the present invention. In the third embodiment, the multiple numbers of control channel elements (CCEs) in which downlink allocation information are received are not selected unlike the first embodiment. Instead, a cyclic shift an orthogonal code sequence in the time domain, and a physical resource block (PRB) are obtained based on a value broadcasted by the base station and the number of control channel elements (CCEs) in which the downlink allocation information is received. Thereby, the transmission diversity is applied to transmission of an acknowledgement (ACK)/negative acknowledgement (NACK) without influencing the other mobile station apparatuses 2. The configurations of a base station apparatus 1 and mobile station apparatuses 2 in the third embodiment are the same as those in the first embodiment.

The base station apparatus 1 in the third embodiment is characterized by transmitting downlink allocation information after notifying each of the mobile station apparatuses 2 of a value used for obtaining a physical resource block (PRB), a cyclic shift and an orthogonal code sequence in the time domain used for transmitting an acknowledgement (ACK)/negative acknowledgement (NACK) and an uplink pilot channel by the mobile station apparatus 2. In order to prevent the multiple mobile station apparatuses 2 from using the same physical resource block (PRB), the cyclic shift and the orthogonal code sequence in the time domain, the base station apparatus 1 also notifies each mobile station apparatus 2 of a value lower than an offset broadcasted by the base station apparatus 1 or a value higher than a value obtained by adding the offset to the maximum control channel element (CCE) number.

The reason why the above value is used is that the first embodiment and the second embodiment have a problem that a restriction is imposed on the arrangement of the downlink allocation information in order that the base station apparatus can avoid a problem that different mobile station apparatuses transmit acknowledgements (ACKs)/negative acknowledgements (NACKs) by using the same physical resource block and orthogonal code, depending on the arrangement of the downlink allocation information. In contrast in this embodiment, the problem can be completely avoided by using the above value (notified value) (the problem can be avoided mostly but not completely in the second embodiment.)

Each of the mobile station apparatuses 2 in the third embodiment selects the lowest number of the numbers of control channel elements (CCEs) in which the downlink allocation information is received. Based on a value obtained by adding the selected number to the offset broadcasted by the base station apparatus and on the value notified by the base station apparatus 1, the mobile station apparatus 2 obtains a physical resource block (PRB), a cyclic shift and an orthogonal code sequence in the time domain which are used for transmitting an acknowledgement (ACK)/negative acknowledgement (NACK) and an uplink pilot channel.

For example, suppose a case where the base station apparatus 1 broadcasts 20 as the offset, notifies the mobile station apparatuses of 4, and transmits downlink allocation information for one of the mobile station apparatuses 2 in control channel elements having the numbers of CCEs of 5 and 6. In this case, the mobile station apparatus 2 selects 5 from the numbers of CCEs. Then, based on a value of 25 obtained by adding the selected number of 5 to the offset of 20 and on the value of 4 notified by the base station apparatus 1, the mobile station apparatus 2 obtains the physical resource block (PRB), the cyclic shift and the orthogonal code sequence in the time domain which are used for transmitting an acknowledgement (ACK)/negative acknowledgement (NACK) and an uplink pilot channel.

Procedures for obtaining the physical resource block (PRB), the cyclic shift and the orthogonal code sequence in the time domain are the same as those described by using the formulae in the first embodiment above, and thus a description thereof will herein be omitted.

Figure 10:
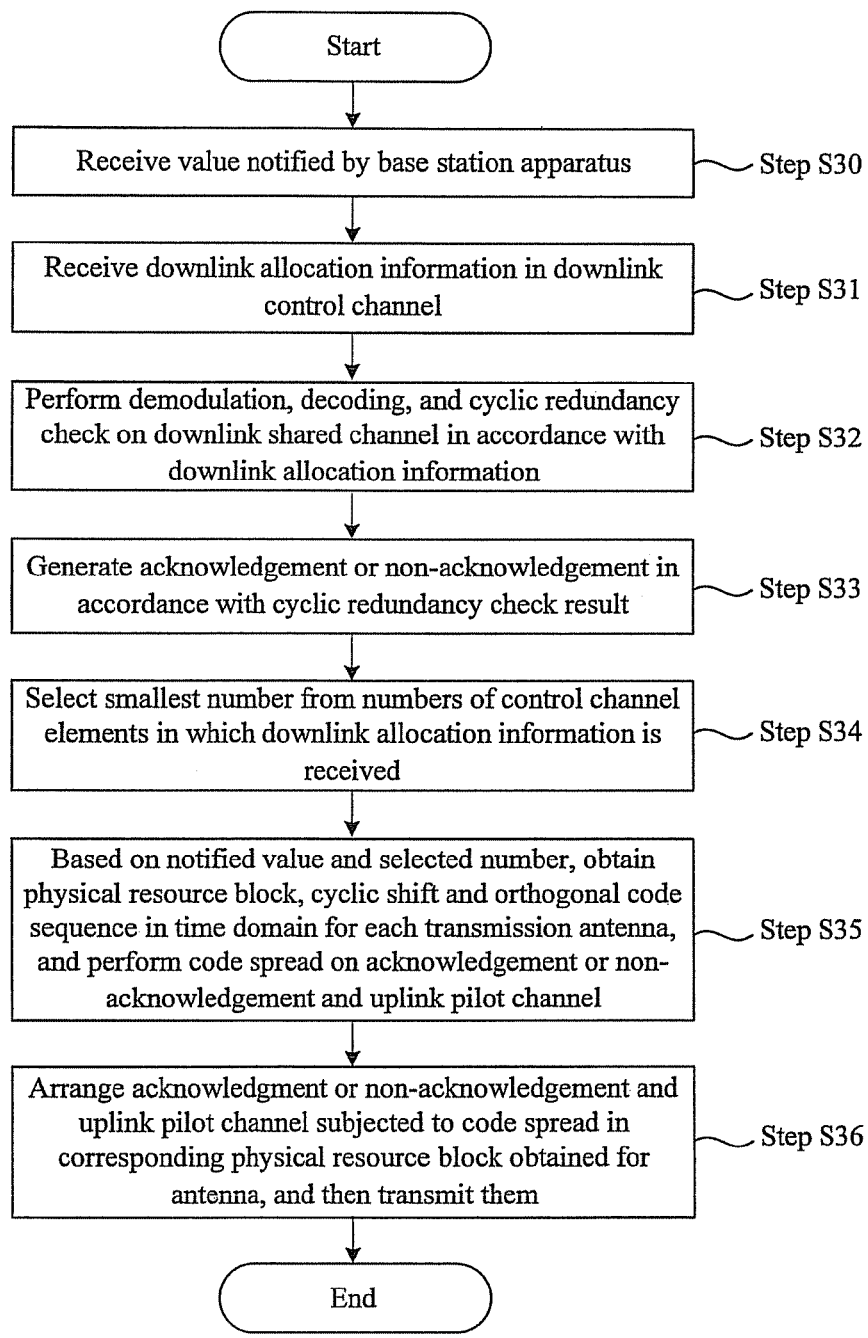
FIG. 10 is a flowchart showing a processing flow of the mobile station apparatus 2 in a third embodiment of the present invention.

FIG. 10 is a flowchart showing a processing flow of the mobile station apparatus 2 in a third embodiment of the present invention. Firstly, the mobile station apparatus 2 receives a value notified by the base station apparatus 1 (Step S30). Next, the mobile station apparatus 2 receives downlink allocation information from the base station apparatus in the downlink control channel (PDCCH) (Step S31). Next, the mobile station apparatus 2 performs demodulation, decoding, and cyclic redundancy check (CRC) on the downlink shared channel (PDSCH) in accordance with the downlink allocation information (Step S32). Next, the mobile station apparatus 2 generates an acknowledgement (ACK) or a non-acknowledgement (NACK) in accordance with a result of the cyclic redundancy check (CRC) (Step S33). Next, the mobile station apparatus 2 selects the lowest number of the numbers of the control channel elements (CCEs) in which the downlink allocation information is received (Step S34). Next, based on the notified value and the selected number, the mobile station apparatus 2 obtains a physical resource block (PRB), a cyclic shift and an orthogonal code sequence in the time domain for each transmission antenna, and performs code spread on the acknowledgement (ACK) or the non-acknowledgement (NACK) and the uplink pilot channel (Step S35). Next, the mobile station apparatus 2 arranges the acknowledgment (ACK) or the non-acknowledgement (NACK) and the uplink pilot channel subjected to the code spread in the corresponding physical resource block (PRB) obtained for the antenna, and then transmits them to the base station apparatus (Step S36).

According to the third embodiment of the present invention, upon receipt of the downlink allocation information in a single or more control channel elements (CCEs), the mobile station apparatus 2 selects multiple combinations of a radio resource, a cyclic shift and an orthogonal code sequence in the time domain, performs code spread on a signal by using the multiple combinations of the radio resource, the cyclic shift and the orthogonal code sequence in the time domain, and transmits resultant signals through multiple transmission antennas. Thereby, although a radio resource for an acknowledgement (ACK)/negative acknowledgement (NACK) is newly consumed, the transmission diversity gain can be obtained without imposing a restriction on the arrangement of the downlink allocation information.

Note that the combination of the physical resource block (PRB), the cyclic shift and the orthogonal code sequence in the time domain is applied to each transmission antenna in the first embodiment, the second embodiment, and the third embodiment of the present invention. However, multiple transmission antenna groups may be formed from the multiple transmission antennas, and the physical resource block (PRB), the cyclic shift and the orthogonal code sequence in the time domain may be applied to each transmission antenna group. For example, a first transmission antenna group is formed from the first transmission antenna and the second transmission antenna, and a second transmission antenna group is formed from the third transmission antenna and the fourth transmission antenna. Then, different combinations of the physical resource block (PRB), the cyclic shift in the time domain, and the orthogonal code sequence may be applied to the first transmission antenna group and the second transmission antenna group, respectively.

Programs running on the base station apparatus 1 and the mobile station apparatuses 2 according to the present invention are programs (programs for causing a computer to function) for controlling a CPU (Central Processing Unit) and the like for the purpose of implementing functions of the aforementioned embodiments according to the present invention. In addition, information handled by these apparatuses is accumulated temporarily in a RAM (Random Access memory) in processing thereof, then stored in any of various ROMs (Read Only Memories) such as a Flash ROM or a HDD (Hard Disk Drive), and read, modified or written by the CPU as necessary.

In addition, processing by the blocks of the apparatuses may be performed in the following manner. Specifically, a program for implementing the functions of the higher layer, the controller, the reception antennas, the reception processor, the demultiplexer, the modulation symbol decoder, the modulation symbol generator, the multiplexer, the transmission processor, and the transmission antennas in FIG. 6, and the higher layer, the controller, the reception antennas, the reception processor, the demultiplexer, the modulation symbol decoder, the modulation symbol generator, the multiplexer, the transmission processor, the transmission antennas in FIG. 7 is recorded in a computer-readable recording medium, and the program recorded in this recording medium is read and executed by a computer system. Note that the "computer system" includes an OS and hardware such as a peripheral device.

In addition, the "computer-readable recording medium" is a storage device including a portable medium such as a flexible disk, a magneto optical disk, and a ROM or a CD-ROM, as well as a hard disk built in the computer system. Moreover, the "computer-readable recording medium" includes: one which dynamically holds a program for a short time like a communication wiring in a case of transmitting a program via a network such as the Internet or a communication line such as a telephone line; and one which holds a program for a certain time period like a volatile memory inside a computer system serving as a server or a client in the aforementioned case of transmitting the program. Besides, the program may implement a part of the aforementioned functions, and furthermore, may be capable of implementing the aforementioned functions in combination with a program already recorded in the computer system.

The embodiments of the present invention have been described in detail by referring to the drawings. However, a concrete configuration thereof is not limited to those in the embodiments, and the present invention includes a design modification and the like which do not depart from the scope of the present invention.

INDUSTRIAL APPLICABILITY

The present invention is applicable to a communication apparatus.

The invention claimed is:
1. A radio communication system comprising:
a plurality of mobile station apparatuses and a base station apparatus, wherein:
the base station apparatus is configured and/or programmed to transmit data, downlink allocation information indicating a result of scheduling of the data the downlink allocation information used for the scheduling of the data, an offset value, and a first value used for deriving a spread code and an uplink radio resource; and each of the mobile station apparatuses is configured and/or programmed to receive, from the base station, the data, the downlink allocation information, the offset value, and the first value, derive a plurality of spread codes and a plurality of uplink radio resources on the basis of the first value and a second value, the second value being derived by adding a lowest number of control channel element(s) in which the downlink allocation information is received to the offset value, spread pilot signals, which are to be used for compensating propagation paths by the base station apparatus, by using each of the derived spread codes determined based on the first value and the second value, and transmit the spread pilot signals in the plurality of derived uplink radio resources through a plurality of transmission antennas.

2. A base station apparatus comprising:

a transmitter configured and/or programmed to transmit, to a mobile station apparatus, data, downlink allocation information indicating a result of scheduling of the data, an offset value, the downlink allocation information used for the scheduling of the data, and a first value used for deriving a spread code and an uplink radio resource;

a receiver configured and/or programmed to receive pilot signals transmitted after a plurality of spread codes and a plurality of uplink radio resources are derived by the mobile station apparatus based on the first value and a second value, the second value being derived by adding a lowest number of control channel element(s) in which the downlink allocation information is received to the offset value, wherein:

the pilot signals are to be used for compensating propagation paths by the base station apparatus, the pilot signals are spread by using each of the plurality of derived spread codes determined based on the first value and the second value, and the pilot signals are transmitted by the mobile station apparatus in the plurality of derived uplink radio resources through a plurality of transmission antennas;

a processor configured and/or programmed to perform inverse spread on the received pilot signals; and demultiplexing logic configured and/or programmed to demultiplex the pilot signals transmitted through the respective transmission antennas of the mobile station apparatus.

3. A mobile station apparatus comprising:

a receiver configured and/or programmed to receive, from a base station device, data, downlink allocation information indicating a result of scheduling of the data, the downlink allocation information used for the scheduling of the data, an offset value, and a first value used for deriving a spread code and an uplink radio resource;

deriving logic configured and/or programmed to derive a plurality of spread codes and a plurality of uplink radio resources on the basis of the first value and a second value, the second value being derived by adding a lowest number of control channel element(s) in which the downlink allocation information is received to the offset value;

spreading logic configured and/or programmed to spread pilot signals, which are to be used for compensating propagation paths by the base station apparatus, by using each of the derived spread codes determined based on the first value and the second value; and a transmitter configured and/or programmed to transmit the spread pilot signals in the plurality of derived uplink radio resources through a plurality of transmission antennas.

4. A radio communication method for a base station apparatus, comprising the steps of:

transmitting, to a mobile station apparatus, data, downlink allocation information indicating a result of scheduling of the data, the downlink allocation information used for the scheduling of the data, an offset value, and a first value used for deriving a spread code and an uplink radio resource;

receiving pilot signals transmitted after a plurality of spread codes and a plurality of uplink radio resources are derived by the mobile station apparatus based on the first value and a second value, the second value being derived by adding a lowest number of control channel element(s) in which the downlink allocation information is received to the offset value, wherein:

the pilot signals are to be used for compensating propagation paths by the base station apparatus, the pilot signals are spread by using each of the plurality of derived spread codes determined based on the first value and the second value, and the pilot signals are transmitted by the mobile station apparatus in the plurality of derived uplink radio resources through a plurality of transmission antennas; performing inverse spread on the received pilot signals; and demultiplexing the pilot signals transmitted through the respective transmission antennas of the mobile station apparatus.

5. A radio communication method for a mobile station apparatus, comprising the steps of:

receiving, from a base station device, data, downlink allocation information indicating a result of scheduling for the data, the downlink allocation information used for the scheduling of the data, an offset value, and a first value used for deriving a spread code and an uplink radio resource;

deriving a plurality of spread codes and a plurality of uplink radio resources on the basis of the first value and a second value, the second value being derived by adding a lowest number of control channel element(s) in which the downlink allocation information is received to the offset value;

spreading pilot signals, which are to be used for compensating propagation paths by the base station apparatus, by using each of the derived spread codes determined based on the first value and the second value; and transmitting the spread pilot signals in the plurality of derived uplink radio resources through a plurality of transmission antennas.

* * * * *